United States Patent
Liao-McPherson et al.

(10) Patent No.: US 10,422,290 B1
(45) Date of Patent: Sep. 24, 2019

(54) SUPERVISORY MODEL PREDICTIVE CONTROLLER FOR DIESEL ENGINE EMISSIONS CONTROL

(71) Applicants: Toyota Motor Engineering & Manufacturing North America, Inc., Plano, TX (US); The Regents of the University of Michigan, Ann Arbor, MI (US)

(72) Inventors: Dominic Liao-McPherson, Ann Arbor, MI (US); Ilya Kolmanovsky, Novi, MI (US); Mike Huang, Ann Arbor, MI (US); Shinhoon Kim, Ann Arbor, MI (US)

(73) Assignees: Toyota Motor Engineering & Manufacturing North America, Inc., Plano, TX (US); The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 15/952,380

(22) Filed: Apr. 13, 2018

(51) Int. Cl.
*F02D 41/00* (2006.01)
*F02M 26/05* (2016.01)
(Continued)

(52) U.S. Cl.
CPC .......... *F02D 41/0052* (2013.01); *F02B 37/24* (2013.01); *F02D 41/1406* (2013.01);
(Continued)

(58) Field of Classification Search
USPC .................. 701/101–105, 107, 114, 115
See application file for complete search history.

(56) References Cited

U.S. PATENT DOCUMENTS 7,389,773 B2 6/2008 Stewart et al.
8,265,854 B2 9/2012 Stewart et al.
(Continued)

FOREIGN PATENT DOCUMENTS

WO 2007132102 A1 11/2007

OTHER PUBLICATIONS

"An explicit model predictive control framework for turbocharged diesel engines", http://ieeexplore.ieee.org/documents/6584790; Published/Accessed: Jul. 2014.
(Continued)

*Primary Examiner* — John Kwon
*Assistant Examiner* — Johnny H Hoang
(74) *Attorney, Agent, or Firm* — Dinsmore & Shohl LLP

(57) ABSTRACT

Systems and methods for controlling an engine airpath include receiving, at a supervisory controller, an engine speed corresponding to a present engine speed, a fuel target corresponding to a request for torque from a driver and one or more state estimates generated by an estimator. The supervisory controller predicts, over a prediction horizon, a constraint violation in response to the engine speed, the fuel target, and the one or more state estimates using a prediction model, adjusts an EGR rate target to a modified value, when the constraint violation is predicted, and maintains the EGR rate target at a nominal value when the constraint violation is not predicted. A nonlinear predictive controller generates one or more actuator commands based on the EGR rate target, where the one or more actuator commands control an engine actuator such that an EGR rate of the engine airpath tracks the EGR rate target.

20 Claims, 16 Drawing Sheets

(51) Int. Cl.
F02B 37/24 (2006.01)
F02D 41/14 (2006.01)
F02M 26/00 (2016.01)

(52) U.S. Cl.
CPC ..... *F02M 26/05* (2016.02); *F02D 2041/1412* (2013.01); *F02D 2041/1433* (2013.01); *F02D 2200/101* (2013.01); *F02D 2200/602* (2013.01); *F02D 2250/36* (2013.01); *F02D 2250/38* (2013.01); *F02M 2026/003* (2016.02); *F02M 2026/005* (2016.02)

(56) References Cited

U.S. PATENT DOCUMENTS

| | | | |
|---|---|---|---|
| 8,620,461 | B2 | 12/2013 | Kihas |
| 9,451,019 | B2 | 9/2016 | Herz et al. |
| 9,677,493 | B2 | 6/2017 | Stewart et al. |
| 9,771,883 | B1 | 9/2017 | Haskara et al. |
| 9,835,094 | B2 | 12/2017 | Lahti et al. |
| 2013/0111905 | A1 | 5/2013 | Pekar et al. |
| 2013/0317722 | A1* | 11/2013 | Midlam-Mohler ............... F02D 41/1401 701/104 |
| 2015/0066337 | A1 | 3/2015 | Langley et al. |
| 2016/0108732 | A1* | 4/2016 | Huang ............... F02D 41/1406 700/282 |
| 2016/0160787 | A1 | 6/2016 | Allain et al. |
| 2017/0218860 | A1 | 8/2017 | Pachner et al. |

OTHER PUBLICATIONS

"Multi-variable air-path management for a clean diesel engine using model predictive control", https://arx.appi.keio.ac.p/wp-content/uploads/2011/05/SAE09WC_2009-01-0733_final.pdf; Published/Accessed: 2009.
"Diesel engines", http://www.idsc.ethz.ch/research-guzzella-onder/research-projects/diesel-engines.html; Published/Accessed: Jan. 5, 2009.
M. Huang, K. Zaseck, K. Butts, and I. Kolmanovsky, "Rate-based model predictive controller for diesel engine path: Design and experimental evaluation," IEEE Transactions on Control Systems Technology, vol. 24 No. 6, pp. 1922-1935, 2016.
P.Ortner and L. del Re, "Predictive control of a diesel engine air path," IEEE Transactions on Control Systems Technology, vol. 15, No. 3, pp. 449-456, 2007.
G. Stewart and F. Borrelli, "A model predictive control framework for industrial turbodiesel engine control" in Decision and Control, 2008, CDC 2008. 47th IEEE Conference on pp. 5704-5711, IEEE, 2008.
M. Huang, H. Nakada, K. Butts, and I. Kolmanovsky, Nonlinear model predictive control of a diesel engine air path: A comparison of constraint handling and computations strategies, IFAC-PapersOnLine, vol. 23, pp. 372-379, 2015.
D. Liao-McPherson, S. Kim, K. Butts, and I. Kolmanovsky, "A cascaded economic model predictive control strategy for a diesel engine using a non-uniform prediction horizon discretization," in 2017 IEEE Conference on Control Technology and Applications (CCTA), pp. 979-986, Aug. 2017.
M. Karlsson, K. Ekhoim, P. Strandh, R. Johansson, and P. Tunesta 1, "Multiple- input multiple-output model predictive control of a diesel engine," IFAC Proceedings Volumes, vol. 43, No. 7, pp. 131-136, 2010.
K. Harder, M. Buchholz, J. Niemeyer, J. Remele, and K. Graichen, "A real-time nonlinear mpc scheme with emission constraints for heavy-duty diesel engines," in American Control Conference (ACC), 2017, pp. 240-245, IEEE, 2017.
T. Broomhead, C. Manzie, P. Hield, R. Shekhar, and M. Brear, "Economic model predictive control and applications for diesel generators," IEEE Transactions on Control Systems Technology, 2016.
I. Kolmanovsky, P. Morel, M. Van Nieuwstadt, and A. Stefanopoulou, "Issues in modeling and control off intake flow in variable geometry turbocharged engines", Chapman and Hail CRC research notes in mathematics, pp. 436-445, 1999.
E. Garone, S. DiCairano and I. Kolmanovsky, "Reference and command governors for systems with constraints; A survey of theory and applications," Automatica, vol. 75, pp. 306-328, 2017.
R. Cagienard, P. Grieder, E. C. Kerrigan and M. Morari, "Move blocking strategies in receding horizon control," Journal of Process Control, vol. 17, No. 6, pp. 563-570, 2007.
M.J. Tippett, C.K. Tan, and J. Bao, "Non-constant prediction step mpc for processes with multi scale dynamics," IFAC Proceedings Volumes, vol. 47 No. 3, pp. 3068-3073, 2014.
J. B. Rawlings and D. Q. Mayne, "Model predictive control: Theory and design," Nob Hill Pub., 2009.
K. Harder, M. Bucholz, J. Niemeyer, J. Remele and K. Graichen, "Nonlinear mpc with emission control for a real-world off-highway diesel engine," in Advanced Intelligent Mechatronics (AIM), 2017 IEEE International Conference on, pp. 1768-1773, IEEE, 2017.
Q. Zhu, S. Onori and R. Prucka, "Nonlinear economic model predictive control for si engines based on sequential quadratic programming," in American Control Conference (ACC), 2016, pp. 1802-1807, IEEE, 2016.
G. C. Goodwin, M. M. Seron and J. A. De Dona, "Constrained control and estimation: an optimisation approach," Springer Science & Business Media, 2006.
T. Maruyama, T. Shimura, A. Ejiri, Y. Ikai and K. Shimotani, "Model predictive control applied to a diesel engine air-path system with dead time," in SICE Annual Conference (SICE), 2011 Proceedings of, pp. 2628-2633, 2011.
A. Murilo, M. Alamir and D.Alberer, "A general nmpc framework for a diesel engine air path," International Journal of Control, vol. 87, No. 10, pp. 2194-2207, 2014.
R. Toth, "Modeling and identification of linear parameter-varying systems," 2010.
H. Li, K. Butts, K. Zaseck, D. Liao-McPherson and I. Kolmanovsky "Emissions modeling of a light-duty diesel engine for model-based control design using multi-layer perception neural networks," tech. rep., SAE Technical Paper, 2017.
M. Diehl, H. G. Bock and J. P. Schloder, "A real-time iteration scheme for nonlinear optimization in optimal feedback control," SIAM Journal on control and optimization, vol. 43, No. 5, pp. 1714-1736, 2005.
M. Diehl, R. Findeisen, F. Allgower, H. G. Bock and J. P. Schloder, "Nominal stability of real-time iteration scheme for non-linear model predictive control," IEE Proceedings-Control Theory and Applications, vol. 152, No. 3, pp. 296-308, 2005.
K. Walker, B. Samadi, M. Huang, J. Gerhard, K. Butts and I. Kolmanovsky, "Design environment for nonlinear model predictive control," tech. rep., SAE Technical Paper, 2016.
L. Del Re, F. Allgower, L. Glielmo, C. Guardiola, and I. Kolmanovsky, Automotive model predictive control: models, methods and applications, vol. 402. Springer, 2010.
L. Grune and J. Pannek, Nonlinear Model Predictive Control, pp. 43-66 Springer, 2011.
Honeywell International Inc., "Powertrain Control" https://turbo.honeywell.com/our-technologies/onramp/ Date Accessed Jun. 7, 2018.

* cited by examiner

SUPERVISORY MODEL PREDICTIVE CONTROLLER FOR DIESEL ENGINE EMISSIONS CONTROL

TECHNICAL FIELD

The present specification generally relates to systems and methods to control a diesel engine airpath and, more specifically, to systems and methods for reducing $NO_x$ and hydrocarbon emissions during driving while limiting visible smoke production without significantly compromising fuel economy or torque response (e.g., drivability).

BACKGROUND

In internal combustion engines, an amount of air supplied to engine cylinders may be manipulated by engine components. For example, in modern diesel engines, variable geometry turbines (VGT) may be used to increase an amount of air supplied to engine cylinders by varying an angle of turbine stator inlet vanes such that the amount of supplied air is changed.

Such modern diesel engines typically balance providing optimum performance and fuel economy while meeting stringent federal regulations on emissions, such as constraints on particulate matter and nitrogen oxides. To meet these requirements, many diesel engines having a VGT also use an exhaust gas recirculation (EGR) valve having a variable controlled position. The EGR valve re-circulates varying amounts of engine exhaust gases back into the engine cylinders to reduce the peak temperature of combustion and reduce $NO_x$ formation, which may be exponential at peak combustion temperatures.

Such engines operate over a large range of operating conditions, which may include, for example, engine speed, fuel usage, and engine load, among other conditions. One or more controllers are embedded in an engine control unit (ECU) to control various engine actuators in response to sensors that detect engine performance. Turbodiesels incorporate a VGT to provide flexible boost, and often use the EGR system to control emissions. However, the addition of both the turbocharger and EGR systems into the engine design introduces strong nonlinearities, complicating control development.

Accordingly, a need exists for an emissions management system and method for turbodiesels with an EGR.

SUMMARY

In one embodiment, a method for controlling an engine airpath includes receiving, at a supervisory controller, an engine speed corresponding to a present engine speed, a fuel target corresponding to a request for torque from a driver and one or more state estimates generated by an estimator. The method further includes predicting over a prediction horizon, with the supervisory controller, a constraint violation in response to the engine speed, the fuel target, and the one or more state estimates using a prediction model, adjusting an EGR rate target to a modified value, with the supervisory controller, when the constraint violation is predicted, and maintaining the EGR rate target at a nominal value when the constraint violation is not predicted. A nonlinear predictive controller receives the EGR rate target, generates one or more actuator commands based on the EGR rate target, where the one or more actuator commands control an EGR throttle, an EGR valve, and VGT such that an EGR rate of the engine airpath tracks the EGR rate target, and transmits the one or more actuator commands to an engine of the engine airpath.

In another embodiment, a system for controlling an engine airpath includes a processor communicatively coupled to a non-transitory computer-readable medium. The non-transitory computer-readable medium stores instructions that, when executed by the processor, cause the processor to receive an engine speed corresponding to a present engine speed, a fuel target corresponding to a request for torque from a driver and one or more state estimates generated by an estimator. The processor further predicts over a prediction horizon a constraint violation in response to the engine speed, the fuel target, and the one or more state estimates using a prediction model. The processor adjusts an EGR rate target to a modified value when the constraint violation is predicted and maintains the EGR rate target at a nominal value when the constraint violation is not predicted. The processor further generates one or more actuator commands based on the EGR rate target. The one or more actuator commands control an EGR throttle, an EGR valve, and VGT such that an EGR rate of the engine airpath tracks the EGR rate target and transmits the one or more actuator commands to a valve of an engine.

In another embodiment, a vehicle includes a diesel engine having a diesel engine airpath, a sensor coupled to the diesel engine airpath, an actuator coupled to the diesel engine airpath and an electronic control unit comprising a processor and a non-transitory computer-readable medium, the electronic control unit communicatively coupled to the sensor and the actuator. The non-transitory computer-readable medium stores instructions that, when executed by the processor, cause the processor to receive an engine speed corresponding to a present engine speed, a fuel target corresponding to a request for torque from a driver and one or more state estimates generated by an estimator. The processor further predicts, over a prediction horizon, a constraint violation in response to the engine speed, the fuel target, and the one or more state estimates, adjusts an EGR rate target to a modified value when the constraint violation is predicted, and maintains the EGR rate target at a nominal value when the constraint violation is not predicted. The processor further generates one or more actuator commands based on the EGR rate target. The one or more actuator commands control the actuator such that an EGR rate of the diesel engine airpath tracks the EGR rate target and transmits the one or more actuator commands to the actuator of the diesel engine.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the present disclosure are directed to the use of a supervisory model predictive controller (SMPC) and a nonlinear model predictive controller (NMPC) in tandem to reduce cumulative $NO_x$ and hydrocarbon emissions during driving while limiting visible smoke production and without significantly compromising fuel economy or torque response (e.g., drivability) for an internal combustion engine plant (e.g., the plant being a diesel engine airpath) that has engine operating parameters as constraints. Generally, the SMPC controller modifies the exhaust gas recirculation (EGR) rate targets and fueling rate commands in real-time to enforce fuel-air ratio constraints and prevent visible smoke while the NMPC controller tracks the EGR rate and intake pressure commands by manipulating an EGR throttle, EGR valve, and variable geometry turbine (VGT). The NMPC controller may implement two variants of the MPC for feedforward and feedback to achieve high speed tracking performance, disturbance rejection, and robustness. As such, the diesel engine airpath (DAP) MPC controller may reduce cumulative emissions relative to a state of the art benchmark strategy when placed in closed-loop with an engine on a transient dyno.

Various embodiments of the diesel engine airpath plant and SMPC and NMPC operations and methods are described in detail herein. It should be understood that the algorithms described herein may be applied to plants other than diesel engine airpaths as will be apparent to those of ordinary skill in the art.

Figure 1:
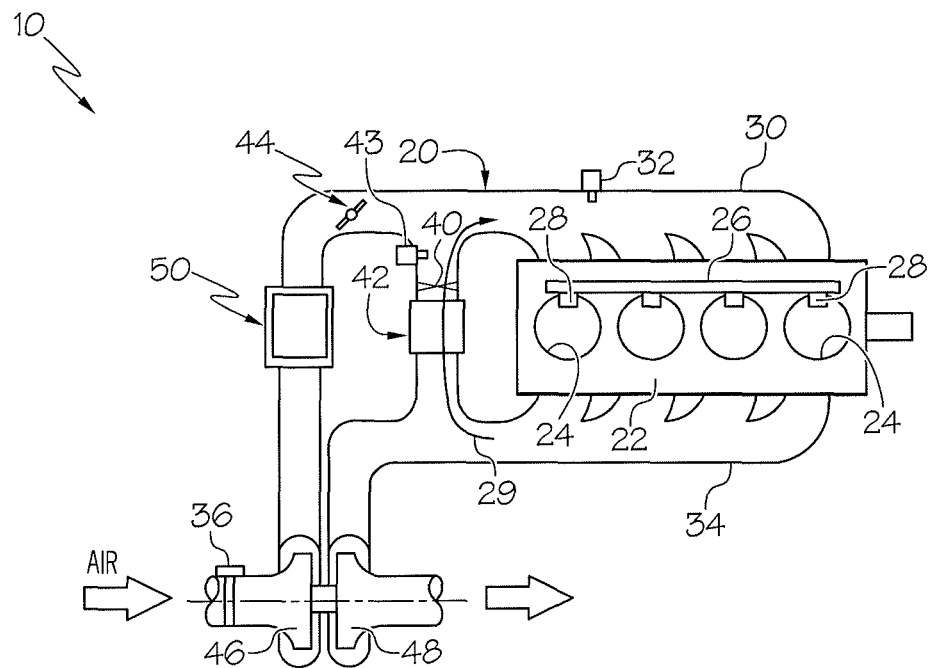
FIG. 1 is a schematic illustration of a diesel engine controlled by a model predictive controller, according to embodiments shown and described herein.

FIG. 1 depicts an internal combustion engine 10, which is, as a non-limiting example, a diesel engine. The internal combustion engine 10 includes an engine block 22 that houses a plurality of cylinders 24. A fuel rail 26 may be connected to a fuel supply (not shown) and supplies diesel fuel to a plurality of fuel injectors 28. Each cylinder 24 is provided with a fuel injector 28.

An intake manifold 30 is coupled to the plurality of cylinders 24 to supply intake air to each cylinder 24. Also coupled to the intake manifold 30 is an intake manifold pressure sensor 32 (also referred to as a MAP sensor) to measure intake manifold air pressure. Combustion gases are carried away from the plurality of cylinders 24 and the engine block 22 by an exhaust manifold 34.

A bypass path 29 between the intake manifold 30 and the exhaust manifold 34 has a coupled EGR valve 40 to re-circulate a portion of the exhaust gases from the exhaust manifold 34 back into the intake manifold 30 for supply to the plurality of cylinders 24. Along with the EGR valve 40, an EGR cooler 42 may be coupled in the bypass path 29. As described above, the EGR valve 40 re-circulates varying amounts of engine exhaust gases back into the plurality of cylinders 24 to allow for both a more complete combustion and reduced engine emissions. The amount the EGR valve 40 is opened controls an amount of engine exhaust gases that are able to re-circulate through the bypass path 29 from the exhaust manifold 34 back into the intake manifold 30. The EGR cooler 42 assists to help prevent the EGR valve 40 from overheating, which may otherwise lead to an increased wear and tear.

An EGR throttle 44 to further assist with controlling gas circulation is mounted in an airflow path from a compressor 46 of a VGT 48. A compressor inlet mass airflow (MAF) sensor 36 may be coupled in line with the compressor 46 to measure the amount of airflow through the compressor 46. An intercooler 50 to assist with preventing overheating of the EGR throttle 44 may be coupled in line between the compressor 46 and the EGR throttle 44 along the airflow path for intake air. The compressor 46 increases a pressure of the incoming air. Further, the VGT 48 includes turbine input vanes that may be opened, partially opened, or closed through an angling of the turbine input vanes to control a VGT lift and to allow for the passage of air in through the EGR throttle 44 to join with the exhaust gases being re-circulated into the intake manifold 30 through the bypass path 29. Thus, by controlling an angle of turbine input vanes, the VGT 48 controls an intake manifold pressure provided by the compressor 46 of the VGT 48. An amount the EGR throttle 44 is opened also restricts the amount of air provided through the VGT 48 that is able to join with air recirculated through the bypass path 29. Also coupled to walls defining the bypass path 29 is an EGR rate sensor 43 to measure EGR rate (such as a fraction of re-circulated air versus fresh air) as the EGR valve 40 and/or the EGR throttle 44 affect it. Another measurement, EGR flow rate or EGR flow, may refer to an amount of mass re-circulated airflow through the EGR valve 40.

Figure 2A:
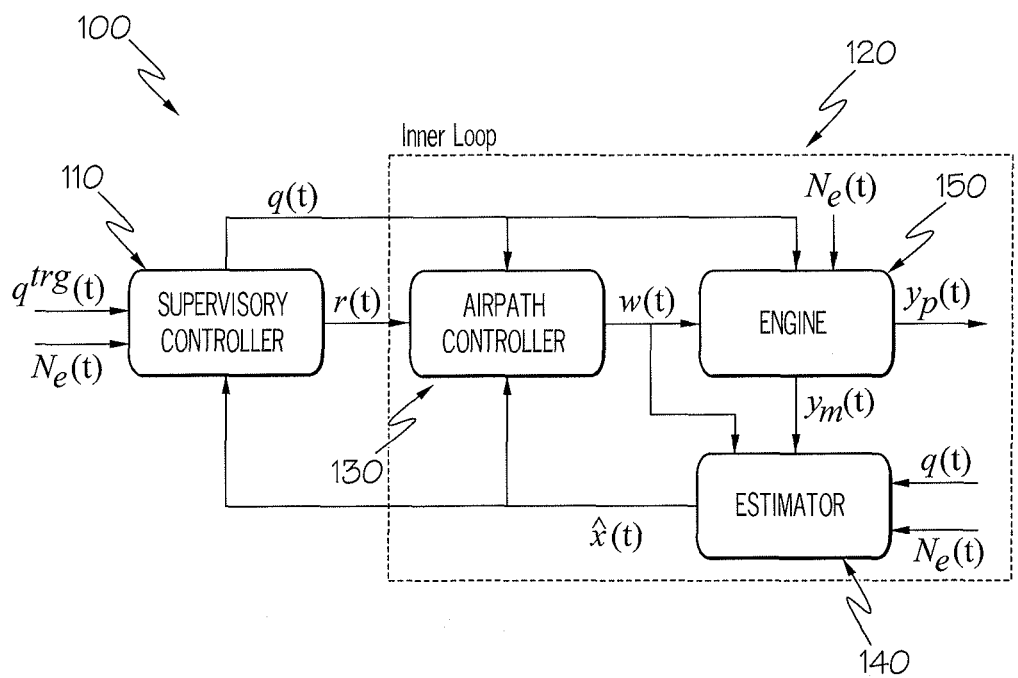
FIG. 2A depicts a schematic illustration of an engine airpath controller having a supervisory controller and a nonlinear controller, according to embodiments shown and described herein.

Referring now to FIG. 2A, a schematic illustration of the engine airpath controller 100 having a supervisory controller 110 and a nonlinear controller 120 is depicted. FIG. 2A is a general representation of the engine path controller 100, which is described in more detail herein. The engine airpath controller 100 includes MPC controllers. Generally, each MPC controller includes three components, i) a prediction model used to estimate the response of the system to a control action, ii) an optimal control problem (OCP) formulation and any required estimators, and iii) a method for solving the aforementioned OCP in real-time. In some embodiments, the MPC computes a control action at each sampling instance by solving an OCP in a receding horizon manner.

In some embodiments, a cascaded strategy may be implemented for the MPC controllers. That is, the architecture may combine a target-generating supervisory controller 110 (i.e., SMPC) and a nonlinear controller 120 (i.e., NMPC) having an airpath controller 130 and one or more estimators 140 communicatively coupled to an engine 150, which in some embodiments may be the internal combustion engine 10 of FIG. 1. The supervisory controller 110 and the nonlinear controller 120 may operate at the same rate, which may be unconventional since cascaded architectures typically rely on timescale separation to manage interactions between inner and outer loops. However, operating at the same rate provides several advantages. First, it allows disturbances and nonlinearities to be handled separately from emissions constraints, "linearizing" the inner-loop from the perspective of the supervisory controller 110. Second, the architecture may be modular whereby the inner loop airpath controller 130 may be one of a variety of types. A particular example is discussed below.

In operation, the supervisory controller 110 generates targets, r(t), and a fuel command, q(t), that are input to the nonlinear controller 120, which uses them to compute actuator commands, w(t) among other things. The actuator commands, w(t), may be generated by the airpath controller 130 of the engine airpath controller 100 depicted in FIG. 2A. Additionally, the airpath controller 130, which is described in more detail herein, generates one or more actuator commands, w(t), for controlling the actuator positions, for example, the position of the EGR throttle 44 ($u_{thr}$), the position of the EGR valve 40 ($u_{val}$), and/or the position of the VGT 48 ($u_{vgt}$).

In some embodiments, the supervisory controller 110 receives an engine speed, $N_e(t)$, corresponding to a present engine speed, a fuel target, $q^{trg}(t)$, corresponding to a request for torque from a driver and one or more supervisory state estimates, $\hat{x}(t)$, generated by an estimator. For example, the fuel rate target, $q^{trg}(t)$, may be determined by mapping a pedal angle to a fueling rate target, $q^{trg}(t)$. As such, the engine speed, $N_e(t)$, and the fuel rate target, $q^{trg}(t)$, define the engine operating point $\rho=[q^{trg}\ N_e]$. Additionally, the compressor, cylinder, fuel, and EGR flows are denoted by $w_c$, $w_{cyl}$, $w_f$, and $w_{egr}$. The fueling rate, which is proportional to $w_f/N_e$, is denoted q and the intake and exhaust manifold pressures are denoted by $p_{im}$ and $p_{ex}$, respectively. The burnt mass fractions in the intake and exhaust manifolds are denoted by $F_1$ and $F_2$ and the EGR rate, $\chi_{egr}=\chi$ is defined as $$\chi = \frac{w_{egr}}{w_{cyl}}.$$

The state estimate and control vectors for the supervisory controller 110 may be denoted as follows:

$$x=[p_{im} p_{ex} w_{vc} F_1 F_2]^T, \text{ and } u=[p_{im}^{trg} \chi^{trg} q]^T \quad (1)$$

The state estimate and control vectors for the airpath controller 130 may be denoted as follows:

$$z=[p_{im}\chi]^T, \text{ and } w=[u_{thr} u_{val} u_{vgt}]^T \quad (2)$$

The supervisory states may further be partitioned in some embodiments into an airpath variable and an EGR loop variable, respectively, denoted by:

$$\xi=[p_{im}p_{ex}w_c]^T, \text{ and } Y=[F_1 F_2]^T \quad (3)$$

Given the above reference notation, elements and functionality, the engine airpath controller 100 will now be described in more detail. The supervisory controller 110, based on a prediction model, may predict whether a constraint violation will occur in response to implementing a fuel target, $q^{trg}(t)$, corresponding to a request for torque from a driver. That is, when a driver depresses an accelerator pedal, a signal may be generated which corresponds to a request for additional torque or power from the engine. Depending on the present engine speed and a variety of other engine variables, the engine airpath controller 100 may determine whether a constraint will be violated. In some embodiments, the constraints of concern to the supervisory controller 110 may include, for example, maximum temperatures, pressure values, fuel-air ratios, regulatory values, or the like. These constraints may correlate to one or more performance attributes of the engine, such as emissions, power, fuel economy, drivability, or the like.

In some embodiments, an objective of the engine airpath controller 100 is to supply the torque requested by the driver (i.e., drivability), while maintaining and/or maximizing fuel economy, respecting regulatory constraint on $NO_x$ and particulate matter(PM), and limiting visible smoke (e.g., quantified by exhaust opacity). By predicting whether a constraint violation will occur in response to implementing a fuel target, $q^{trg}(t)$, corresponding to a request for torque from a driver, the supervisory controller 110 may generate an EGR rate target, $\chi^{trg}$, having a modified value from a nominal value and/or an adjusted fuel command, q(t). In some embodiments, the supervisory controller 110 may also generate an intake manifold pressure target, $p_{im}^{trg}$, in response to the fuel target, $q^{trg}(t)$, corresponding to a request for torque from a driver. For example, during a tip-in (i.e., a fuel step up) the fuel-air ratio rapidly increases since fuel may be added to the system more quickly than the airflow to compensate, accordingly, the supervisory controller 110 may predict this fuel-air ratio constraint violation. In response, the supervisory controller 110 may adjust the EGR rate target down, so that it undershoots its nominal value in order to reduce $F_1$. In other words, the EGR rate target decrease reduces or eliminates the violation of the fuel-air ratio constraint.

To predict a constraint violation, the engine airpath controller 100 may rely on engine models. For example, the supervisory controller 110 may implement a closed-loop airpath prediction model to estimate the response of a nonlinear controller 120 to the fueling target and fueling command. In some embodiments, the closed-loop airpath prediction model may be defined by:

$$\xi_{k+1}=F(\rho)+A(\rho)\xi_k+B(\rho)u_k, \quad (4)$$

where A, B, and F are appropriately sized operating condition dependent matrices. In some embodiments, the supervisory controller 110 may utilize a burnt gas fraction model to predict the emissions response of the system by tracking the evolution of the burnt gas fractions (BGF) in the intake manifold, $F_1$ and exhaust manifold, $F_2$. For example, a burnt gas fraction model may be expressed in the form $\dot{Y}=G(\xi)Y+b(\xi)q$, and the BGF equations may be written as:

$$\begin{bmatrix} \dot{F}_1 \\ \dot{F}_2 \end{bmatrix} = \begin{bmatrix} \frac{-(w_{egr}+w_{th})}{m_1} & \frac{w_{egr}}{m_1} \\ \frac{w_y}{m_2} & \frac{-(w_{cyl}+w_f)}{m_2} \end{bmatrix} \begin{bmatrix} F_1 \\ F_2 \end{bmatrix} + \begin{bmatrix} 0 \\ \frac{1+(A/F)_E}{m_2} \end{bmatrix} cN_e q, \quad (5)$$

$$m_1 = \frac{p_{im}V_{im}}{R_{air}T_{im}}, m_2 = \frac{p_{ex}V_{ex}}{R_{ex}T_{ex}}, \quad (6)$$

where c is the constant such that $w_f=cN_e q$, $R_{air}$ is the gas constant of air, $R_{ex}$ is the gas constant of the exhaust gas, and $V_{im}$, $V_{ex}$, $T_{im}$, and $T_{ex}$ are the volumes and temperatures of the intake and exhaust manifolds. The effective air-fuel ratio, denoted by: $(A/F)_E$, quantifies the mass of oxygen consumed per unit fuel and is calibrated as a function of operating condition based on analyzed exhaust data. The cylinder flow may be estimated as a linear, operating condition dependent function of intake pressure, i.e., $w_{cyl}=a(\rho)p_{im}+b(\rho)$, the EGR flow is estimated as $w_{egr}=w_{cyl}-w_c$, and the throttle flow $w_{th}$ may be assumed to be equal to the compressor flow. In a steady state situation, the BGF equations reduce to the following relationship between the gas fractions and EGR rate:

$$\chi = \frac{F_1}{F_2} = \frac{w_{egr}}{w_{cyl}} \quad (7)$$

Furthermore, since the equations are linear in $\Upsilon$, the update equation can be computed, for example, as:

$$\Upsilon_{i+1} = (I_{2\times 2} - \Delta\tau_1 G(\xi_i))^{-1}(\Upsilon_i + \Delta\tau_1 b(\xi_i) q_i), \quad (8)$$

where $\Delta\tau_1$ is the integration step size. These two models may be combined to form the prediction dynamics of the supervisory controller 110. As such, the prediction model, written in the form $x_{i+1} = f_s(x_i, u_i, \rho, \Delta\tau_i)$, may be given by:

$$\begin{bmatrix} \xi \\ \gamma \end{bmatrix}_{i+1} = \begin{matrix} R_i(\rho) + A_i(\rho)\delta\xi_i(\rho) + B(\rho)\delta u_i(\rho) \\ (I_{2\times 2} - \Delta\tau_1 G(\xi_i))^{-1}(\gamma_i + \Delta\tau_1 b(\xi_i) q_i) \end{matrix} \quad (9)$$

In some embodiments, the prediction, by the supervisory controller 110, may be determined over a prediction horizon. To do so in an efficient manner, the temperatures and engine speed may be considered constant over the prediction horizon. Additionally, as the length of the uniform prediction horizon increases, for example, to capture the dynamics of interest, a large number of discrete time steps are required. This may lead to additional decision variables, which increases the computational complexity. However, in some embodiments, a non-uniform integration of the prediction horizon may be used to. For example, the following function, Eq. 10, may be implemented to determine time step sizes over the prediction horizon, effectively reducing the total length of the horizon.

$$\Delta\tau_i = \begin{cases} t_s & i \leq 2 \\ 6t_s & 2 < i \leq 4 \\ 40t_s & 4 < i \leq 8 \end{cases} \quad (10)$$

As such, the short steps may ensure consistency between the model and what is applied, the medium steps may capture emission peaks, and the long steps may capture the intake and exhaust pressure responses.

Figure 7:
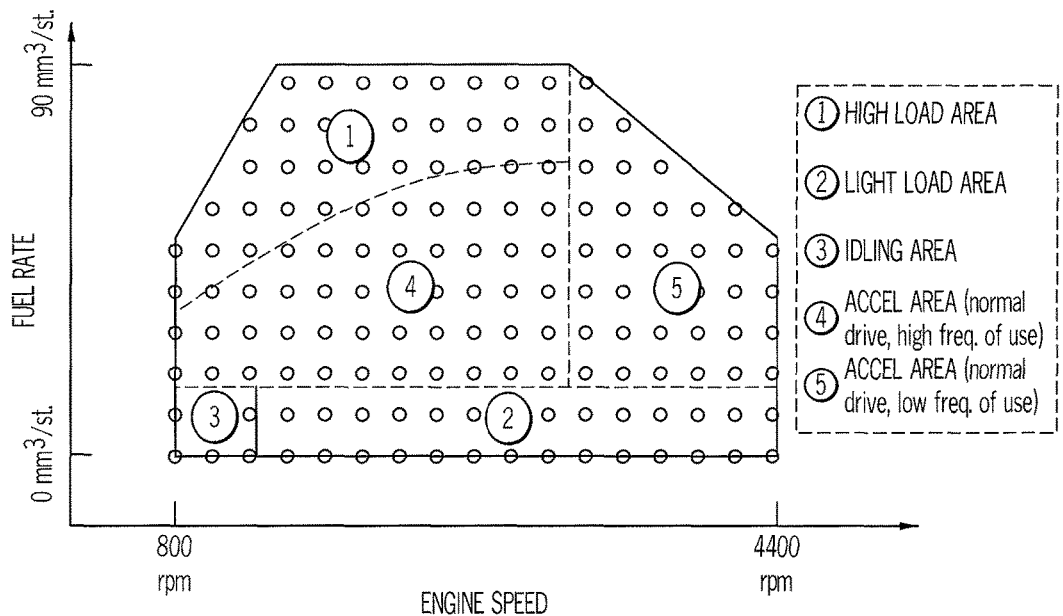
FIG. 7 depicts a set point map of operating conditions for an engine, according to embodiments shown and described herein.

Still referring to FIG. 2A, the nonlinear controller 120 receives the adjusted EGR rate target, intake manifold target pressure, and/or the fuel command. The nonlinear controller 120 estimates the response of the system based on these received values. The nonlinear controller 120, like the supervisory controller 110, may rely on engine models to estimate the system response to throttle, EGR valve, and VGT commands. For example, the nonlinear controller 120 may implement an open-loop airpath model. The open-loop airpath model may be data driven to generate models of the EGR rate and intake pressure response to the throttle, EGR valve, and VGT actuation. In other words, the nonlinear controller 120 may define a grid of operating points (e.g., as depicted in FIG. 7), for example, $\bar{\rho} = [q_1 \; q_2 \; q_3 \; \ldots \; q_{14}] \times [N_{e1} \; N_{e2} \; N_{e3} \; \ldots \; N_{e11}]$, then perturb the system around each operating point to generate identification data. As such, at each operating point a model of the following form may be identified:

$$z_{k+1} = \tilde{F}(\rho_i) + \tilde{A}(\rho_i) z_k + \tilde{B}(\rho_i) w_k + \theta(z_k, w_k, \omega_i), \quad (11)$$

where $\tilde{F}$, $\tilde{A}$, and $\tilde{B}$ are appropriately sized, parameter dependent, matrices and $\theta$ is a nonlinear function. The linear properties of the model may be identified first using least squares. The nonlinear function $\theta(z_k, w_k, \omega_i)$ may then be identified using the error signal $e_k = z_{k+1} - \tilde{F}(\rho_i) - \tilde{A}(\rho_i) z_k + \tilde{B}(\rho_i) w_k$. In some embodiments, a polynomial basis function may be used to parameterize the nonlinear portion of the model. As such, the nonlinear function is given by:

$$\theta = \omega(\rho)^T \Phi(y, 2), \; y = [z^T w^T]^T, \quad (12)$$

where $\omega$ is a coefficient and $\Phi(y,d)$ is a basis for $\mathbb{P}^d$, the set of all polynomials in n variables of degree $>1$ and $\leq d$, e.g., $$\mathbb{P}^2 = \text{span}\{x_1^2, x_1 x_2, x_2^2\} \quad (13)$$

The coefficient, $\omega$, is identified using linear least squares. Since the model is linear in its parameters, the coefficients are interpolated between grid points using linear interpolation, resulting in a nonlinear parameter-varying model. For example, the result of the nonlinear model may be compared with the same model using only the linear terms ($\omega=0$) for a particular operating point.

It should now be generally understood that the supervisory controller 110 and the nonlinear controller 120 operate in a cascade architecture where the supervisory controller 110 predicts a constraint violation based on at least a fuel rate target and provides the nonlinear controller 120 with adjusted targets in response to predicting a constraint violation. The nonlinear controller 120, using engine models, such as those described above, may determine actuator commands to transmit to the engine for operating the engine with reduced or no constraint violations. However, due to the complicated tradeoff between fuel economy, $NO_x$ emissions, and total hydrocarbon concentration (THC) emissions, the engine airpath controller 100 should also shape the transient response of the system as it transitions between operating points. In other words, transient shaping has a significant impact on performance because a significant portion of emissions production occurs in transients. Additionally, the response speed of the system to fuel commands affects drivability.

Furthermore, the outputs of the system may be split into measurements, constraints, and performance variables, $y_m$, $y_c$, and $y_p$, respectively, as shown in equation (14) below.

$$y_m = [p_{im} w_c N_e]^T, \; y_c = \phi, \; y_p = [\Psi_{SM} \Psi_{NO_x} \Psi_{HC} \tau_q]^T \quad (14)$$

The measurements, $y_m$, are available for feedback and the fuel-air ratio may be estimated from the measurements. The performance outputs: torque, smoke (exhaust opacity), $NO_x$ concentration, and THC, denoted $\tau_q$, $\Psi_{SM}$, $\Psi_{NO_x}$, and $\Psi_{HC}$, respectively are not available for feedback.

Figure 2B:
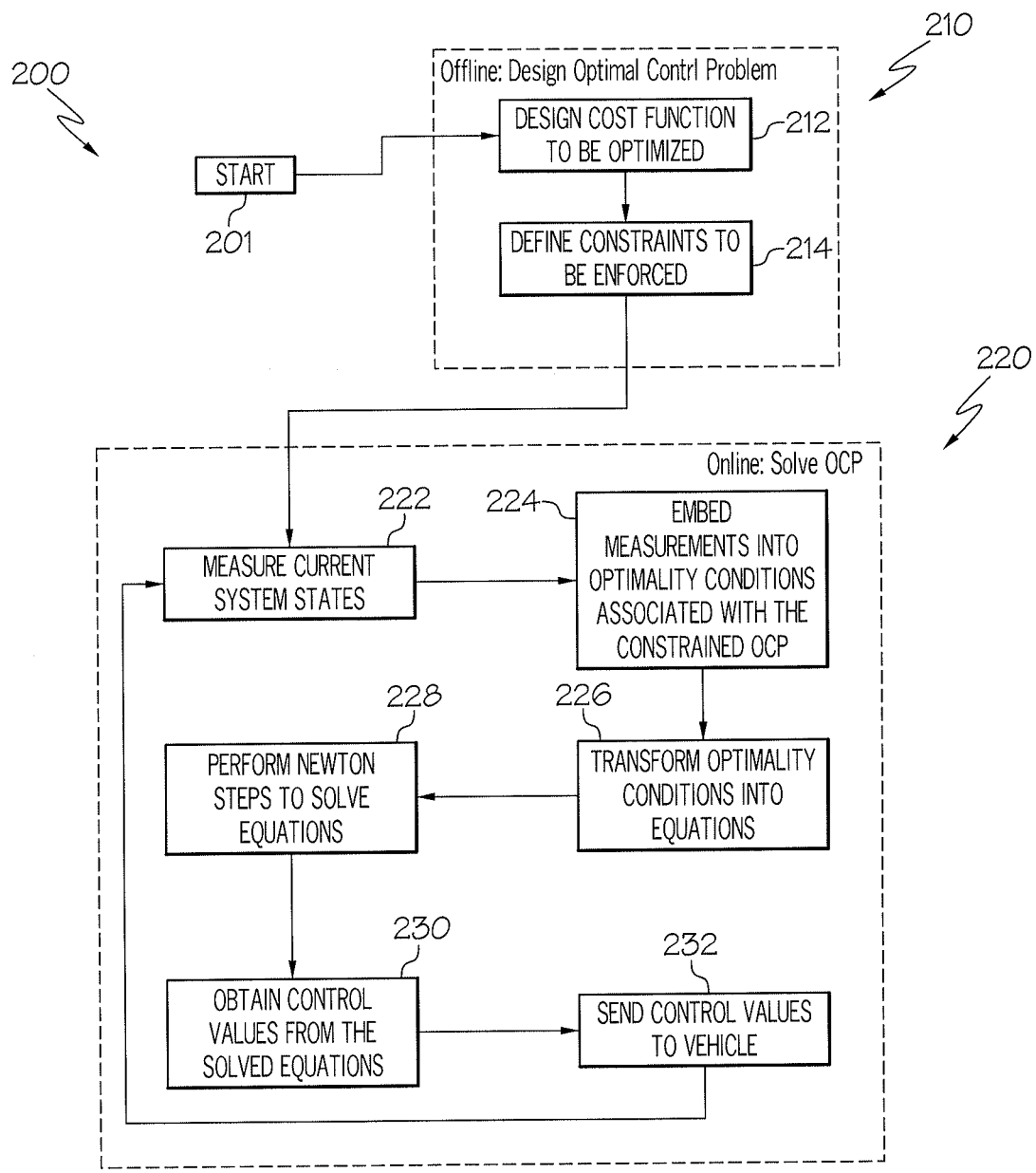
FIG. 2B depicts a flow diagram of the engine airpath controller process, according to embodiments shown and described herein.

Referring now to FIG. 2B, a diagram of a process 200 implemented with the engine airpath controller 100 is depicted. The general process includes two components, an offline portion 210 including blocks 212 and 214 and an online portion 220 including blocks 222, 224, 226, 228, 230, and 232. The distribution of the blocks between the offline portion 210 and the online portion 220 are illustrative and non-limiting. In some embodiments, one or more of the blocks in the offline portion 210 may be performed online, and conversely, one or more of the blocks in the online portion 220 may be performed offline. In block 212, a cost function to be optimized is defined. In block 214, constraints to be enforced are defined. Also performed offline in some embodiments, calibrators determine optimal operating conditions at each point in the speed-load map at steady state conditions, as depicted for example in FIG. 7. In block 222, measurements from various sensors corresponding to the current system states are collected. For example, these measurements may be taken from stock sensors implemented in the vehicle, including sensors such as the MAP sensor 32, MAF sensor 36, engine speed sensor, EGR flow sensor 43, or the like. In block 224, the measurements may be embedded into optimality conditions associated with the constrained OCP. In block 226, the optimality conditions may be transformed into equations using the Fischer-Burmeister function. Since the Fischer-Burmeister function is not continuously differentiable, either smoothing or the use of generalized derivatives may be necessary. In block 228, the equations may be solved, for example, using Newton steps such that control values may be obtained from the solved equations, in block 230. In block 232, the control values may be sent to the vehicle to control the operation of the engine and/or engine airpath.

As referenced above with respect to FIG. 2B, an optimal control problem may be solved at each sampling instance $t_k$ for the fueling rate and the EGR target. In some embodiments, the optimal control problem for the supervisory controller 110 is characterized by the following:

$$\min_{s,u,x} J(s, u, \rho_k) = \sum_{i=0}^{N} l(u_i, u_{i-1}, \rho_k) \qquad (15)$$

$$\text{s.t } x_{i+1|k} = f_s(x_{i|k}, u_{i|k}, \rho_k, \Delta\tau_i), i = 0, \ldots, N-1 \qquad (16)$$
$$\phi(x_{i|k}, u_{i|k}, \rho_k) - \phi l(\rho_k, w_{c,k}) \le s, i = 0, \ldots, N$$
$$\chi_{lb}^{trg}(\rho_k), i = 0, \ldots, N-1$$
$$0 \le q_{i|k} \le q_k^{trg}, i = 0, \ldots, N-1$$
$$s \ge 0$$

where $u=[\chi_{0|k}^{trg} \ldots \chi_{N-1|k}^{trg}]^T$, and $x=[\chi_{1|k}^T \ldots \chi_{N|k}^T]^T$. In some embodiments, the intake pressure target is not modified, i.e., it is set at $p_{im,k}^{trg}=\bar{p}_{im}(\rho_k)$. The constraint $x_{0|k}=x(t_k)$ is enforced implicitly. The stage cost function is given by $$l(u_i,u_{i-1},\rho)=\gamma(\chi_{i|k}^{trg}-\chi_{egr})^2+\alpha(q_{trg}-q)+\beta s+\|u_{i|k}-u_{i-1|k}\|_R^2 \qquad (17)$$

where $\alpha>0$, $\beta>0$, $\gamma>0$, and $R>0$ are tuning parameters and include tracking objectives for the EGR rate target and fueling rate, a penalty to soften the fuel-air ratio constraint to guarantee feasibility, and a damping term. The cost function does not depend on system outputs. The fuel command and/or EGR rate target are only modified in response to a predicted constraint violation. The slack penalty, $\beta s$, defines an L1 softened constraint on the fuel-air ratio which is used to limit the visibility of smoke. The fuel-air ratio may be computed using $$\phi = \frac{w_f}{w_{cyl}(1-F_1)}\left(\frac{A}{F}\right)_s,$$

where (A/F) is the stoichiometric air-fuel ratio of the fuel. The fuel-air ratio limit, $\phi(\rho, w_c)$, is a characteristic of the engine that is determined from engine mapping. Furthermore, it typically increases with compressor flow and decreases with engine speed. The fuel tracking term, $\alpha(q^{trg}-q)$, enforces drivability and since it is linear, $0 \le q_{i|k} \le q_k^{trg}$, $i=0, \ldots, N-1$, is needed to ensure that the fuel does not exceed the request. The remaining constraints, a lower bound on $\chi^{trg}$ and a fueling rate nonnegativity constraint, make the control constraint set compact.

In some embodiments, the supervisory controller OCP may be compactly represented as:

$$\min_{z_k} J(z_k, \hat{x}_k, \rho_k),$$

$$\text{s.t } c(z_k, \hat{x}_k, \rho_k) \le 0, \qquad (18)$$

where $z_k=[u_k^T \ S_k^T] \in \mathbb{R}^n$ are collected primal decision variables, $\hat{x}_k \in \mathbb{R}^{n_5}$ is the SMPC state estimate, $\rho_k \in \mathbb{R}^{n_2}$ is the operating condition, $J: \mathbb{R}^{n_n} \times \mathbb{R}^{n_5} \times \mathbb{R}^{n_2} \to \mathbb{R}^n$ is the cost function and $c: \mathbb{R}^{n_n} \times \mathbb{R}^{n_5} \times \mathbb{R}^{n_2} \to \mathbb{R}^{n_m}$ are the inequality constraints. All equality constraints, including the nonlinear dynamics, have been eliminated by substitution. Therefore, this nonlinear program may be approximated by the following quadratic program $$\min_{\Delta z_k} \frac{1}{2}\Delta z_k^T H_k \Delta z_k + f_k^T \Delta z_k, \qquad (19)$$
$$\text{s.t } A_k \Delta z_k \le b_k,$$

where $H_k=\nabla_z^2 J(z_{k-1},\hat{x}_k,\rho_k) \ge 0$, $f_k=\nabla_z f(z_{k-1},\hat{x}_k,\rho_k)$, $A_k=\nabla_z c(z_{k-1},\hat{x}_k,\rho_k)$, and $b=-c(z_{k-1},\hat{x}_k,\rho_k)$. In operation, one instance of Eq. (19) is solved per time step as in the real-time iteration scheme. The supervisory control update is then computed as:

$$u_k=[\bar{p}_{im}\rho_k z_k(1:2)^T]^T, \ z_k=z_{k-1}+\Delta z_k. \qquad (20)$$

Figure 3:
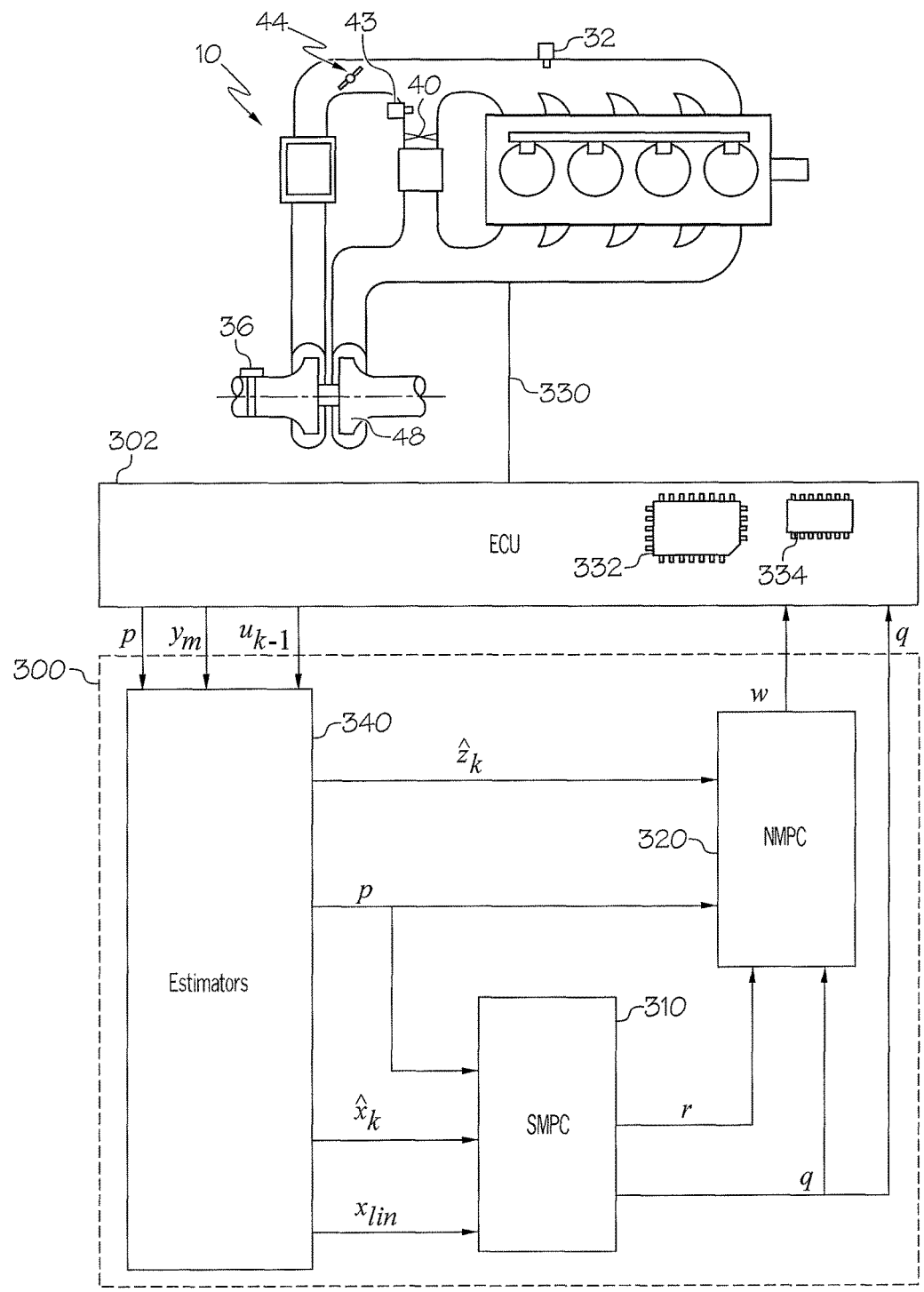
FIG. 3 depicts a schematic illustration of an engine airpath controller having a supervisory controller and a nonlinear controller communicatively coupled with an electronic control, according to embodiments shown and described herein.

Referring now to FIG. 3, an engine airpath controller 300 having a supervisory controller 310 and a nonlinear controller 320 communicatively coupled with an electronic control unit 302 and an internal combustion engine 10 is depicted. The electronic control unit (ECU) 302 is communicatively coupled to actuators. The ECU 302 may include a processor 332 that may execute a computer program stored on a non-transitory computer-readable memory component 334 within the ECU 302 and includes instructions that are executable by the processor 332 to direct the engine airpath controller 300 as described herein. The ECU 302 may include a central processing unit (CPU) that is any type of device or devices capable of manipulating or processing information. The CPU may be practiced with a single or multiple processors.

The ECU 302 may be communicatively coupled to the actuators (e.g., to actuate the EGR valve 40, the EGR throttle 44, and/or the VGT 48), internal combustion engine 10, and sensors (e.g., the intake manifold pressure sensor 32 (MAP), compressor inlet mass airflow sensor 36 (MAF), EGR rate sensor 43, or the like) through a communication path 330. The communication path 330 may be formed from any medium that is capable of transmitting a signal such as, for example, conductive wires, conductive traces, optical waveguides, or the like, or from a combination of mediums capable of transmitting signals. The communication path 330 communicatively couples the various components of the internal combustion engine 10 and the ECU 302. As used herein, the term "communicatively coupled" means that coupled components are capable of exchanging data signals with one another such as, for example, electrical signals via conductive medium, electromagnetic signals via air, optical signals via optical waveguides, and the like.

As noted above, the ECU 302 may include one or more processors 332 that can be any device capable of executing machine-readable instructions. Accordingly, a processor 332 may be a controller, an integrated circuit, a microchip, a computer, or any other computing device. The processor 332 is communicatively coupled to the other components of FIG. 1 by the communication path 330. Accordingly, the communication path 330 may communicatively couple any number of processors 332 with one another, and allow the modules coupled to the communication path 330 to operate in a distributed computing environment. Specifically, each of the modules can operate as a node that may send and/or receive data.

The ECU 302 also includes a memory component 334, which is coupled to the communication path 330 and communicatively coupled to the processor 332. The memory component 334 may be a non-transitory computer-readable medium and may be configured as a nonvolatile computer-readable medium. The memory component 334 may comprise RAM, ROM, flash memories, hard drives, or any device capable of storing machine-readable instructions such that the machine-readable instructions can be accessed and executed by the processor 332. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The ECU 302 further includes additional storage or databases to store components such as off-line pre-computed matrices, as described in detail further below. The memory component 334 may include machine-readable instructions that, when executed by the processor 332, cause the processor 332 to perform the functions of the ECU 302, operating as an engine airpath controller 300.

In some embodiments, the ECU 302 is communicatively coupled to the engine airpath controller 300. In other embodiments, the engine airpath controller 300 including the estimators 340, supervisory controller 310 (SMPC), the nonlinear controller 320 (NMPC) and the estimators 340 may be implemented with the ECU 302 such that instructions for carrying out the steps of the engine airpath controller 300 are stored in the memory component 334 and the processor 332 executes the steps.

As depicted in FIG. 3, the ECU 302 may provide the estimators 340 with signals corresponding to engine operating conditions, $\rho$, measurements, $y_m$, from one or more sensors, and the previous plant inputs, $u_{k-1}$. The engine operating conditions, $\rho$, may include a fuel request target, $q^{trg}$, and engine speed, $N_e$. The measurements, $y_m$, may include signals from the sensors corresponding to the intake manifold pressure, $p_{im}$, (MAP) and the compressor inlet mass airflow, $w_c$, (MAF). In addition to the measurements several estimated quantities are needed. The exhaust pressure and all temperature estimates are obtained using logic from the production engine control unit (ECU). The EGR flow is estimated using a steady state mass balance equation $w_{egr} \approx w_{cyl} - w_c$, the cylinder flow is estimated as a function of operating condition and intake pressure using a static map, for example stored in the ECU. The EGR rate can be calculated as $$\chi = \max\left(0, \frac{w_{egr}}{w_{cyl}}\right).$$

The burnt gas fractions may be obtained by propagating Eqs. 5 and 6. The normalized fuel-air ratio may also be estimated using $$\phi = \frac{w_f}{w_{cyl}(1-F_1)}\left(\frac{A}{F}\right)_s,$$

where (A/F) is the stoichiometric air-fuel ratio of the fuel.

Utilizing the measurements provided by the ECU from engine sensors and methods of estimating quantities not directly obtained from sensor measurements, the estimators 340 may calculate SMPC state estimates, $\hat{x}_k$, and NMPC state estimates, $\hat{z}_k$. The SMPC state estimates, $\hat{x}_k$, may include the intake manifold pressure, $p_{im}$, the exhaust manifold pressure, $p_{ex}$, the compressor inlet mass air flow, $w_c$, the intake burnt gas fraction $F_1$ and the exhaust burnt gas fraction, $F_2$. The NMPC state estimates, $\hat{z}_k$, may include intake manifold pressure, $p_{im}$, and the EGR rate estimate, $\chi$. The estimators 340 may also calculate a consistent linearization point using the modified intake pressure signal and provide the linearization point, $x_{lin}$, to the supervisory controller 310.

In some embodiments, the supervisory controller 310 receives engine operating conditions, $\rho$, which include a fuel request target, $q^{trg}$, indicative of a request for torque from a driver, an engine speed, $N_e$, and one or more state estimate signals, $\hat{x}_k$, generated by an estimator 340. In some embodiments, the supervisory controller 310 may also receive the linearization point, $x_{lin}$ from the estimators 340. The supervisory controller 310 solves the OCP (i.e., Eqs. 15 and 16) at each sampling instance, $t_k$, and generates one or more targets, r, which may include the EGR rate target, $\chi^{trg}$, a fuel command, q, and/or intake manifold pressure target, $p_{im}$. In some embodiments, the supervisory controller 310 may predict, over a prediction horizon, whether a constraint violation will occur in response to the engine speed, $N_e$, the fuel target, $q^{trg}$, and the one or more state estimate signals. If the supervisory controller 310 predicts a constraint violation, the supervisory controller 310 may generate an EGR rate target, $\chi^{trg}$, having a modified value such that the constraint violation is either eliminated or reduced. In some embodiments, the supervisory controller 310 may generate a modified fuel command q and transmit it to the ECU 302 and the nonlinear controller 320. In some embodiments, the supervisory controller 310 may generate a modified intake manifold pressure target, $p_{im}$, in response to predicting a constraint violation.

In some embodiments, the nonlinear controller 320 receives NMPC state estimates, $\hat{z}_k$, engine operating conditions, $\rho$, which include a fuel request target, $q^{trg}$, indicative of a request for torque from a driver, an engine speed, $N_e$, and outputs from the supervisory controller 310. The outputs from the supervisory controller 310 may also include targets, r, (e.g., modified or unmodified from a previous instance) which may include the EGR rate target, $\chi_{trg}$, the fuel command, q and/or the intake manifold pressure target, $p_{im}$. The nonlinear controller 320 estimates the system response to the received NMPC state estimates, $\hat{z}_k$, engine operating conditions, $\rho$, and the one or more targets, r. In response, the nonlinear controller 320 generates one or more actuator commands, w, based on the EGR rate target, where the one or more actuator commands, w, control an EGR throttle, an EGR valve, and VGT such that an EGR rate of the engine airpath tracks the EGR rate target. For example, the nonlinear controller 320 may solve one or more OCPs in the process of determining the one or more actuator commands (e.g., Eqs. 21-24).

The actuator commands, w, and the fuel command, q, may be transmitted to the ECU 302. The ECU 302 may transmit the commands to the corresponding actuators and engine components. targets, r, including the EGR rate target, $\chi^{trg}$, a fuel command, and/or intake manifold pressure target, $p_{im}$.

Figure 4:
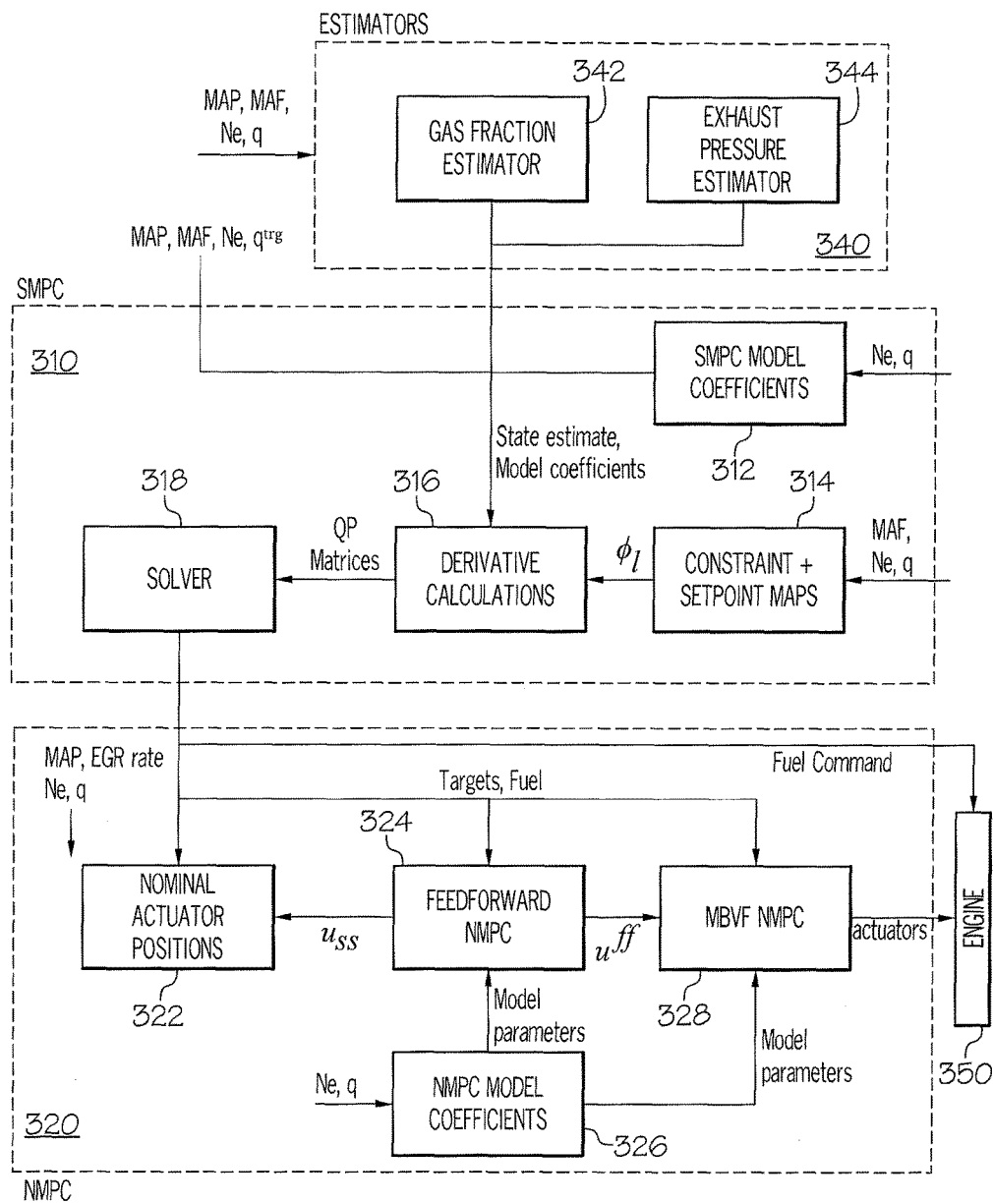
FIG. 4 depicts a detailed diagram of the engine airpath controller process, according to embodiments shown and described herein.

Referring now to FIG. 4, a detailed diagram of the engine airpath controller process is depicted. Similar to FIGS. 2A and 3, the engine airpath controller includes three main components, the estimators 340, the supervisory controller 310, and the nonlinear controller 320. In the embodiment depicted in FIG. 4, an engine 350 (e.g., the internal combustion engine 10 of FIG. 1) is communicatively coupled to the engine airpath controller. The estimators 340 include a gas fraction estimator 342 for calculating and/or estimating the burnt gas fraction in the intake and/or the exhaust portion of the engine airpath. The estimators 340 also include an exhaust pressure estimator 344, which may calculate and/or estimate an exhaust manifold pressure, $p_{ex}$.

The supervisory controller 310 may receive the SMPC state estimates, $\hat{x}_k$, and the engine operating conditions, ρ, which includes a fuel request target, $q^{trg}$, and engine speed, $N_e$. The supervisory controller 310, in block 312, determines model coefficients, optionally, using linear interpolation to compute the coefficients between grid-points. Additionally, in block 314, the supervisory controller 310 determines, based on MAF, Ne, and q, a fuel-air ratio engine constraint using a set point map (e.g., as depicted in FIG. 7). It is noted that in some embodiments the supervisory controller 310 does not determine operating points online by optimizing efficiency subject to NOx constraints, rather the supervisory controller 310, solving the OCP may determine a minimum deviation from nominal operating points (e.g., set points) as determined by calibrators to reduce or avoid a constraint violation.

In block 316, the supervisory controller 310 applies derivative calculations to the OCP to generate QP matrices. In block 318, a solver is implemented to calculate targets, r, including the EGR rate target, $\chi^{trg}$, a fuel command, and/or intake manifold pressure target, $p_{im}$. The fuel command, q, may be transmitted to the engine 350 and the nonlinear controller 320. In block 322 of the nonlinear controller 320, the EGR rate target, $\chi^{trg}$, a fuel command, q, and/or intake manifold pressure target, $p_{im}$ are input into a nonlinear controller 320 having an architecture that utilizes a feedforward controller 324 and feedback controller 328. The feedforward controller 324 receives multiple inputs to generate control constraints, which are fed into the feedback controller 328. The feedforward controller 324 may receive nominal actuator positions, $u_k$, fictitious measurements, denoted by $\tilde{z}_k$ from the nominal plant 322, and the EGR rate target, $\chi^{trg}$, a fuel command, q, and/or intake manifold pressure target, $p_{im}$ from the supervisory controller 310. The feedforward controller 324 may also receive model parameters from the model coefficients block 326, for example, generated from the open-loop airpath model, as described above, such that the feedforward controller 324 may estimate the engine's response to newly generated actuator commands. The feedback controller 328 receives multiple inputs including the generated feedforward controller 324 actuator commands and further refines the actuator commands utilizing real measurements, $\hat{z}_k$, generated by one or more of the estimators 340. In some embodiments, estimator 340 utilizes sensor readings from sensors coupled with the engine to provide state estimates (i.e., real measurements), for example, NMPC state estimates, $\hat{z}_k$. As a result, the nonlinear controller 320 calculates and generates actuator commands to track the EGR rate target, $\chi_{trg}$, a fuel command, q, and/or intake manifold pressure target, $p_{im}$. The actuator commands are transmitted to one or more of the engine valves and throttles for adjusting the operation of the engine. The feedforward controller 324 and feedback controller 328 will be described in more detail with respect to FIG. 6.

Figure 5:
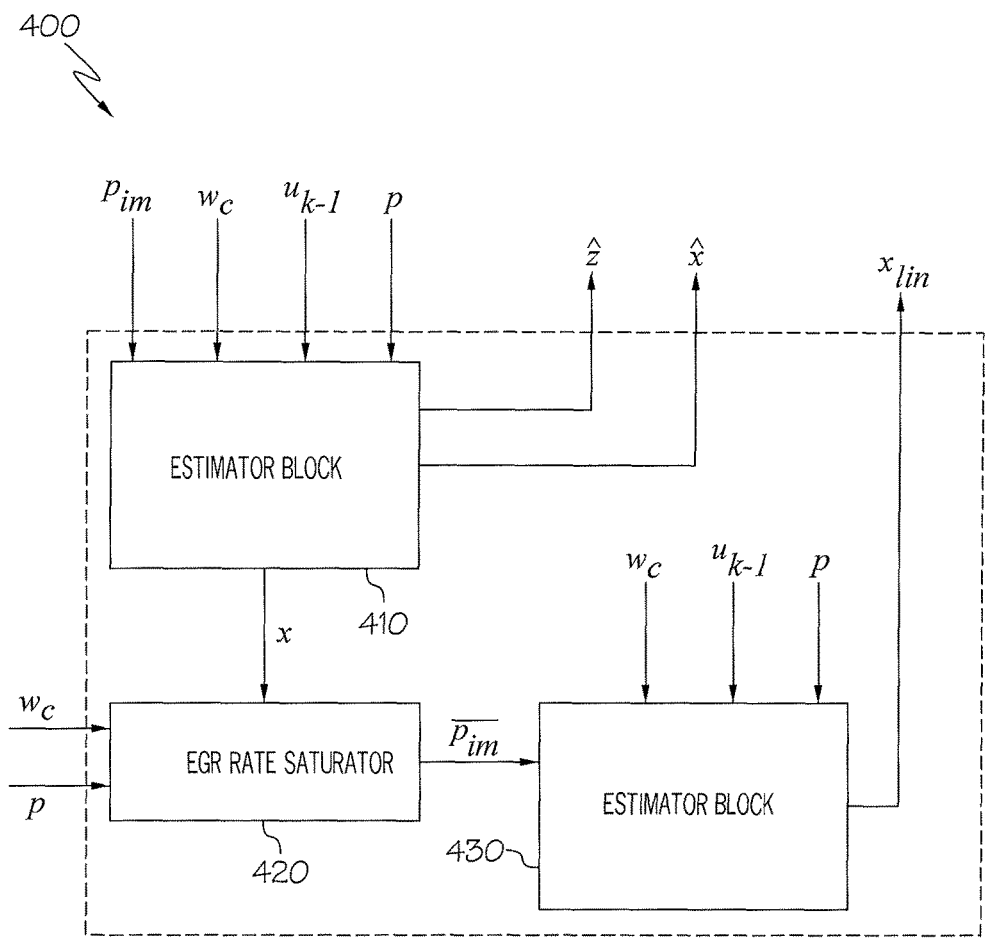
FIG. 5 depicts a diagram of the estimators implemented in the engine airpath controller, according to embodiments shown and described herein.

Referring now to FIG. 5, a diagram of the estimators 400 implemented in one or more engine airpath controllers is depicted. In some embodiments, the estimators 400 may include more than one estimator. The embodiment depicted in FIG. 5 includes three estimators: estimator 410, EGR rate saturator 420, and estimator 430, which may be interconnected or may stand alone. Estimator 410 may receive signals indicative of engine operating conditions, p, intake manifold pressure, $p_{im}$, (MAP) the compressor inlet mass airflow, $w_c$, (MAF), and the previous plant inputs, $u_{k-1}$. Estimator 410 calculates both the SMPC and NMPC state estimates, $\hat{x}_k$ and $\hat{z}_k$, respectively. Estimator 410 also provides the EGR rate saturator 420 with the EGR rate estimate, χ, calculated when determining the NMPC state estimates, $\hat{z}_k$. The EGR rate saturator 420 saturates the EGR rate estimate, χ, at about 5%, optionally about 2%, 3%, 4%, 6%, 7%, 8%, 9% or 10% by modifying the intake manifold pressure, $\bar{p}_{im}$. The modified intake manifold pressure, $\bar{p}_{im}$, is communicated from the EGR rate saturator 420 to estimator 430. Estimator 430 calculates a consistent linearization point, $x_{lin}$, for input to the supervisory controller 310 as shown in FIG. 3, using the modified intake manifold pressure, $\bar{p}_{im}$. In some embodiments, estimator 430 is a copy of estimator 410 such that the processes and calculations within the estimator are the same, but the intake manifold pressure input is a modified value from the EGR rate saturator 420.

Figure 6:
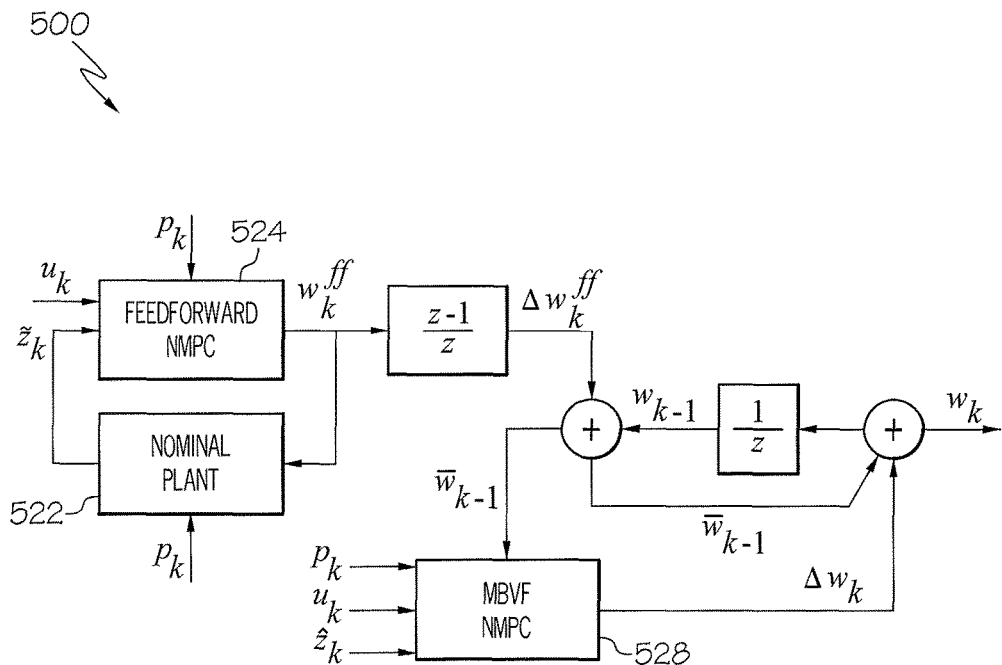
FIG. 6 depicts a diagram of a feedforward and feedback (MBVF) nonlinear architecture, according to embodiments shown and described herein.

Referring now to FIG. 6, a diagram of the nonlinear controller 500 having a feedforward controller 524 and a feedback controller 528 (MBVF) architecture is depicted. The feedforward controller 524 provides high performance and the feedback controller 528 provides robustness, disturbance rejection, and integral action. FIG. 6 depicts a more detailed representation of the nonlinear controller 320 depicted and described in FIG. 3. Both the feedforward controller 524 and feedback controller 528 may be NMPC controllers. The feedback controller 528 may be rate-based (or velocity form) and the feedforward controller 524 may not. FIG. 6, illustrates how they are connected. A process to compute the control is shown below in Algorithm 1 where Steps 4-6 are graphically shown in FIG. 6:

Algorithm 1: Input: $y_{m,k}, \rho_k, z_{k-1}, w_{k-1}$
1: Read $P_{ex,k}, T_{ex,k}, T_{im,k}$ from the ECU
2: Compute $\chi_k, F_{1,k}, F_{2,k}$
3: Compute $r_k$, $q_k$ by solving Eq. 15 and 16, the SMPC OCP
4: Compute $\Delta \bar{w}_k^{ff}$ by solving Eqs. 21 and 22, the NMPC feedforward OCP
5: Compute $\bar{w}_{k-1} + w_{k-1} w^{ff}$ then solve Eqs. 23 and 24, the NMPC feedback OCP for $\Delta w_k$
6: Compute $\bar{w}_k = w_{k-1} + \Delta w_k^{ff} + \Delta w_k$
7: Return $w_k, q_k$ In some embodiments, the feedforward controller 524 and the feedback controller 528 each include an OCP for solving online. For example, the feedforward controller 524 may include an OCP defined by:

$$\min_{w, ff, z} J^{ff}(z, w^{ff}, \rho_k) = \sum_{i=0}^{N} l_{ff}(z_i, w_i^{ff}, \rho_k) \qquad (21)$$

-continued $$\text{s.t } z_{i+1|k} = f_a(z_{i|k}, w_{i|k}^{ff}, \rho_k), i = 0, \ldots, N-1, \quad (22)$$

$$w_{lb} \le w_i^{ff} \le w_{ub}, i = 0, \ldots, N-1,$$

$$z_{0|k} = \tilde{z}_k$$

Additionally, the feedback controller 528 may include an OCP defined by:

$$\min_{\Delta w_{di}, z_{di}} J_{fb} = \sum_{i=0}^{N-1} l_{fb}(\tilde{z}_{di}, \Delta w_{di}, \rho_k) \quad (23)$$

$$\text{s.t } \tilde{z}_{d(i+1)} = \bar{f}_a(z_{di}, \Delta w_{di}, \rho_k), i = 0, \ldots, N-1, \quad (24)$$

$$w_{lb} \le w_i^{ff} \le w_{ub}, i = 0, \ldots, N-1,$$

$$z_{0|k} = \tilde{z}_k$$

$$\Delta z_{0|k} = \hat{z}(t_k) - \hat{z}(t_{k-1})$$

$$w_{-1} = w(t_{k-1})$$

Referring back to FIG. 6, a nominal plant 522 is communicatively coupled to the feedforward controller 524. The nominal plant generates fictitious measurements, denoted by $\tilde{z}_k$ as opposed to the real measurements, $\hat{z}_k$, (also referred to as NMPC state estimates) which are provided to the feedback controller 528. In the square boxes z stands for the discrete shift operator, e.g., $u_{k+1}=z\, u_k$. By solving the OCP for each of the feedforward controller 524 and the feedback controller 528, the nonlinear controller 500 may estimate the response of the engine and generate actuator commands for controlling one or more actuators of the internal combustion engine 10 (FIG. 1).

Turning to FIG. 7, an example speed-load map for a diesel engine is depicted. In some embodiments, the engine airpath controller extracts operating parameters from the speed-load map. Calibrators may determine the optimal operating conditions at each point in the speed-load map at steady state conditions. For example, the calibrators may determine feasible steady state maps for desired intake pressure, $\bar{p}_{im}(\varphi)$, and EGR rate, $\bar{x}_{egr}(\rho)$, as a function of operation condition (e.g. engine speed, $N_e$, and fuel rate, q) which manage the aforementioned tradeoffs, for example, between fuel economy, $NO_x$, and THC emissions. The objective of the engine airpath controller is to shape the transient response of the system as it transitions between operating points. The transient shaping has a significant impact on performance; a significant portion of emissions production occurs in transients. By utilizing a speed-load map with predetermined steady state values, the engine airpath controller does not need to calculate these operating parameters while online, rather the engine airpath controller may look up the optimal operating conditions and utilize the operating parameters in the optimal control functions, estimations, and prediction models to more efficiently generate a system response.

Experiment and Results

The engine airpath controller was placed in closed-loop with a Toyota GD engine on a transient dyno and run over the Worldwide Harmonized Light Vehicles Test Cycle (WLTC) and New European Driving Cycle (NEDC) drive-cycles. The results are shown in FIGS. 8A-11L. A summary of the results, using the best tunings obtained during testing, is shown in Table II. Emissions performance was evaluated using the relative difference defined as $$\% \text{ difference} = \frac{\text{Engine Airpath Controller} - \text{Benchmark}}{\text{Benchmark}} * 100. \quad (25)$$

Smoke was evaluated by counting the number of spikes, which exceeded the visible limit. Over the WLTC the engine airpath controller was able to significantly reduce cumulative $NO_x$ and THC, by mass, compared to a Toyota benchmark controller. The aggressive tuning had similar drivability as the benchmark and yielded significant $NO_x$ and THC reductions at the cost of two additional visible smoke events. A more conservative tuning brought the number of visible smoke spikes in line with the benchmark but reduced the $NO_x$ and THC benefit, and drivability was adversely affected as well.

Over the NEDC the engine airpath controller slightly increased $NO_x$ and slightly decreased THC. The NEDC cycle is not aggressive enough to trigger fuel limiting or cause visible smoke events. The increase in fuel consumption is not large enough to be considered significant as the results are estimated by integrating the commanded fuel signal rather than measured using a fuel meter.

A summary of the results obtains using the engine airpath controller are shown in Table 1 below.

|  | WLTC aggressive tuning | WLTC conservative tuning | NEDC aggressive tuning |
|---|---|---|---|
|  | [% difference] | [% difference] | [% difference] |
| $NO_x$ | −16 | −11 | 1.4 |
| THC | −14 | −4 | −2 |
| Fuel | 0.67 | 0.54 | 0.9 |
| $V_{RMSE}$ | 1 | 4 | 2 |
| Smoke | 24 | −49 | 0 |

Figure 8A:
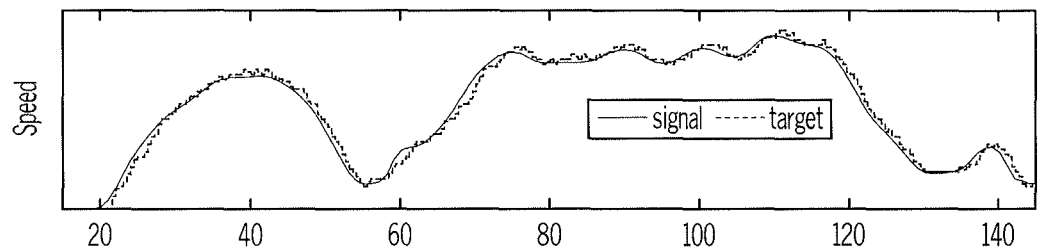
FIG. 8A depicts a chart of vehicle speed as a function of time during the high load portion of the WLTC, according to embodiments shown and described herein.
Figure 8B:
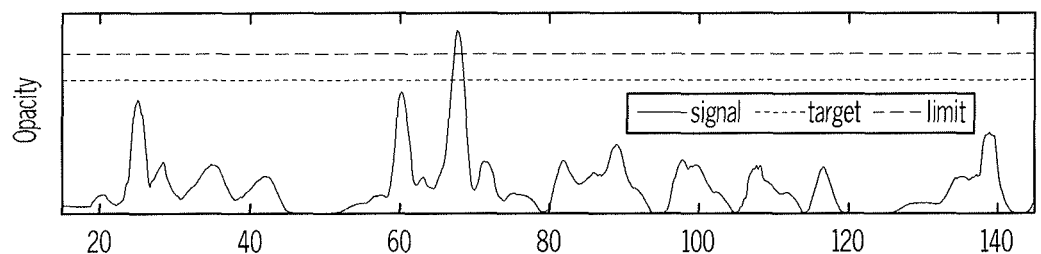
FIG. 8B depicts a chart of smoke opacity as a function of time during the high load portion of the WLTC, according to embodiments shown and described herein.
Figure 8C:
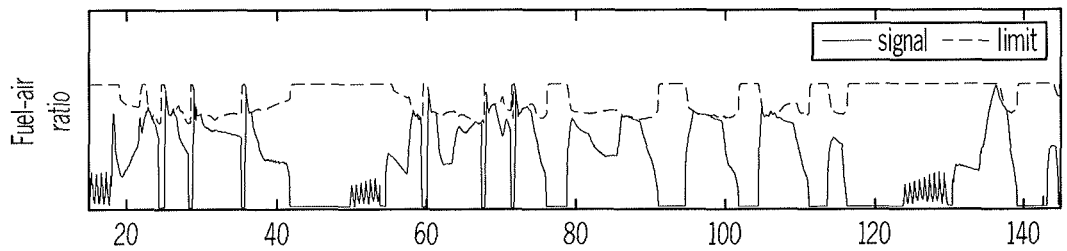
FIG. 8C depicts a chart of fuel-air ratio as a function of time during the high load portion of the WLTC, according to embodiments shown and described herein.
Figure 9A:
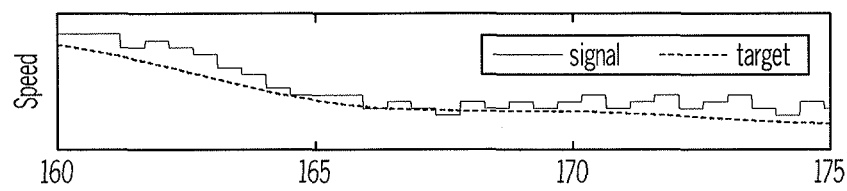
FIG. 9A depicts a chart of vehicle speed as a function of time during the high speed portion of the WLTC, according to embodiments shown and described herein.
Figure 9B:
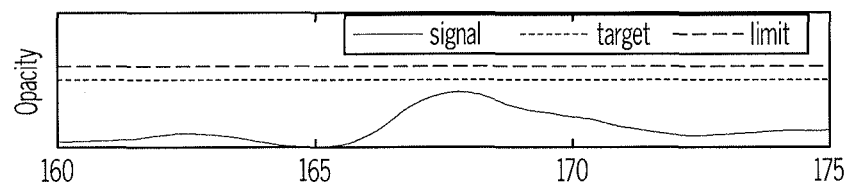
FIG. 9B depicts a chart of smoke opacity as a function of time during the high speed portion of the WLTC, according to embodiments shown and described herein.
Figure 9C:
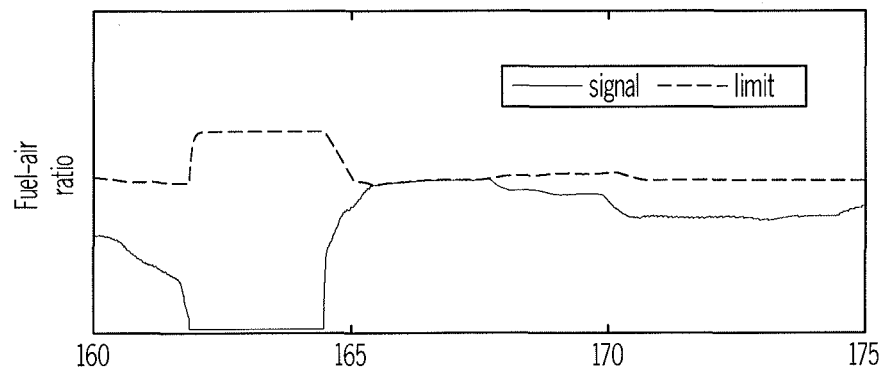
FIG. 9C depicts a chart of fuel-air ratio as a function of time during the high speed portion of the WLTC, according to embodiments shown and described herein.
Figure 9D:
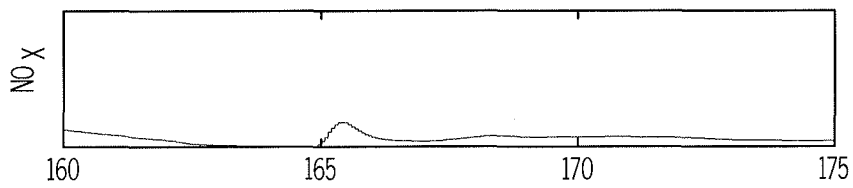
FIG. 9D depicts a chart of $NO_x$ as a function of time during the high speed portion of the WLTC, according to embodiments shown and described herein.
Figure 9E:
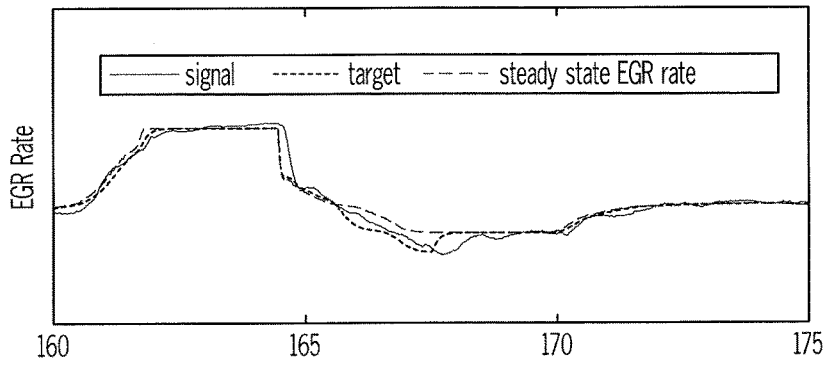
FIG. 9E depicts a chart of EGR rate as a function of time during the high speed portion of the WLTC, according to embodiments shown and described herein.
Figure 9F:
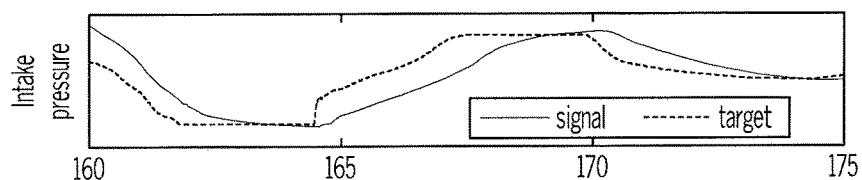
FIG. 9F depicts a chart of intake manifold pressure as a function of time during the high speed portion of the WLTC, according to embodiments shown and described herein.
Figure 9G:
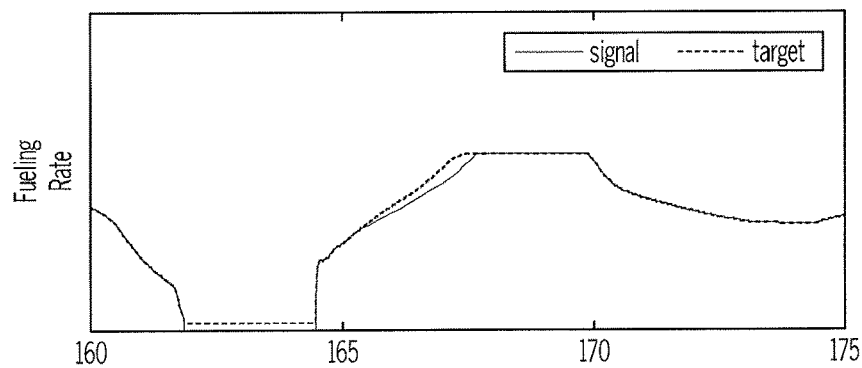
FIG. 9G depicts a chart of fueling rate as a function of time during the high speed portion of the WLTC, according to one or more embodiments shown and described herein.
Figure 9H:
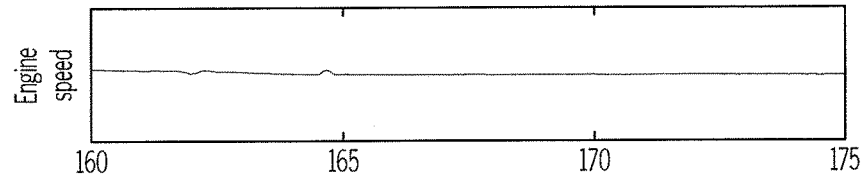
FIG. 9H depicts a chart of engine speed as a function of time during the high speed portion of the WLTC, according to embodiments shown and described herein.
Figure 9I:
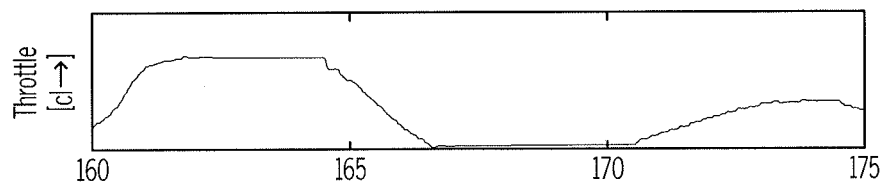
FIG. 9I depicts a chart of throttle (percent closed) as a function of time during the high speed portion of the WLTC, according to embodiments shown and described herein.
Figure 9J:
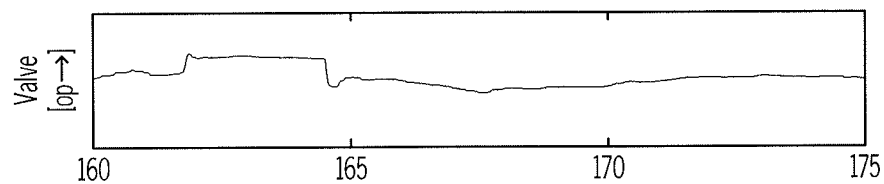
FIG. 9J depicts a chart of EGR valve (percent open) as a function of time during the high speed portion of the WLTC, according to embodiments shown and described herein.
Figure 9K:
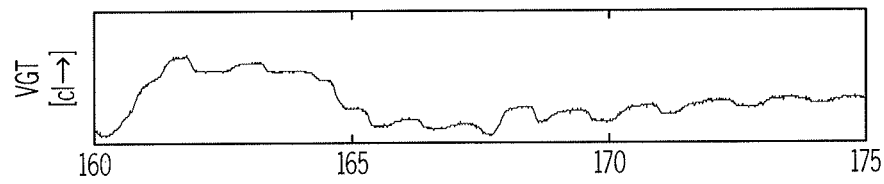
FIG. 9K depicts a chart of VGT (percent closed) as a function of time during the high speed portion of the WLTC, according to embodiments shown and described herein.
Figure 9L:
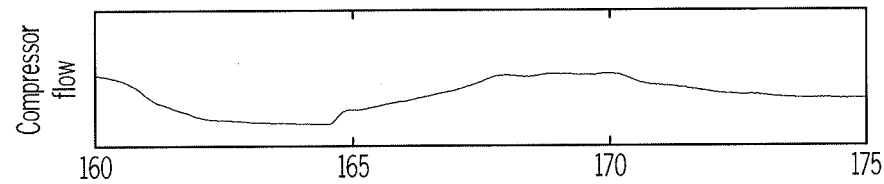
FIG. 9L depicts a chart of compressor flow as a function of time during the high speed portion of the WLTC, according to embodiments shown and described herein.
Figure 9M:
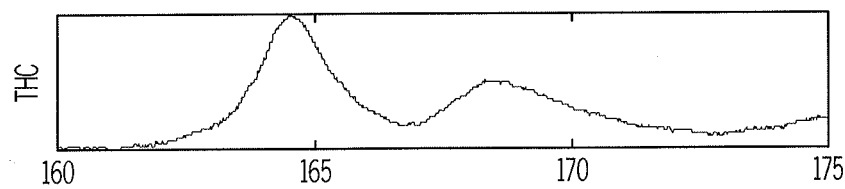
FIG. 9M depicts a chart of total hydrocarbon concentration (THC) as a function of time during the high speed portion of the WLTC, according to embodiments shown and described herein.
Figure 10A:
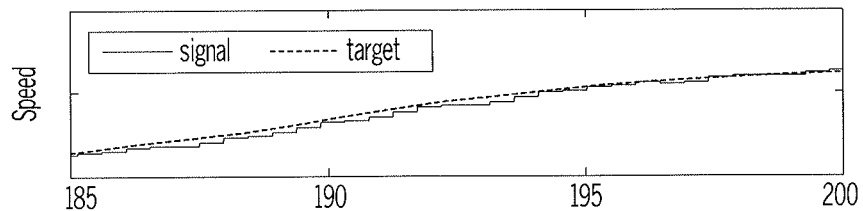
FIG. 10A depicts a chart of vehicle speed as a function of time during a hard acceleration event, according to embodiments shown and described herein.
Figure 10B:
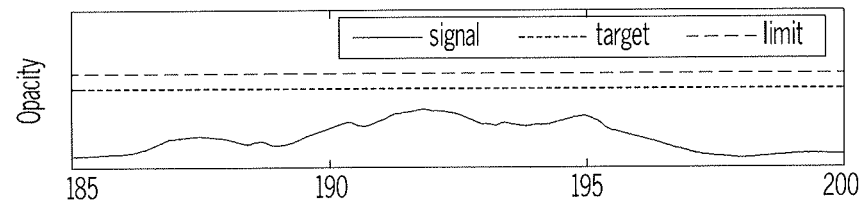
FIG. 10B depicts a chart of smoke opacity as a function of time during a hard acceleration event, according to embodiments shown and described herein.
Figure 10C:
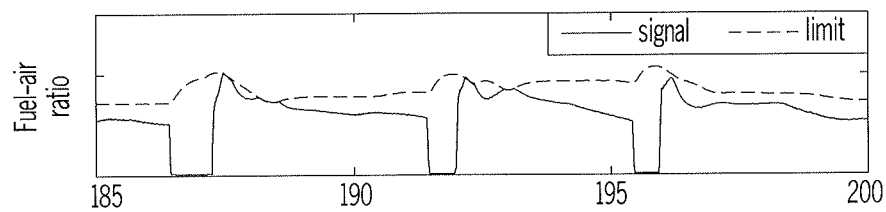
FIG. 10C depicts a chart of fuel-air ratio as a function of time during a hard acceleration event, according to embodiments shown and described herein.
Figure 10D:
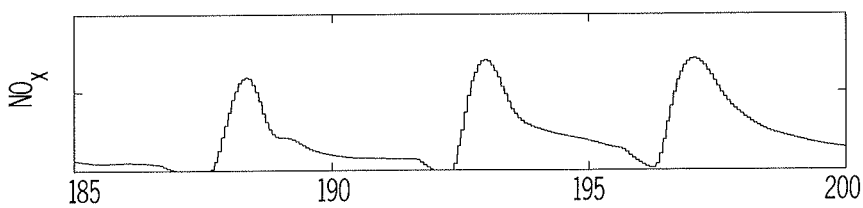
FIG. 10D depicts a chart of $NO_x$ as a function of time during a hard acceleration event, according to embodiments shown and described herein.
Figure 10E:
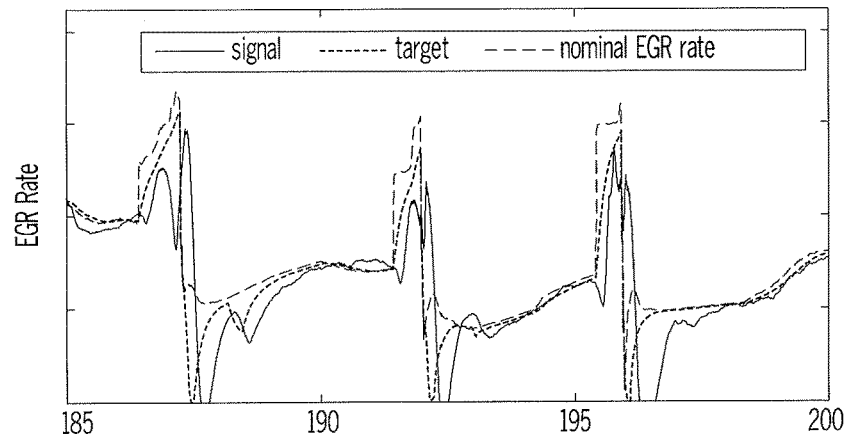
FIG. 10E depicts a chart of EGR rate as a function of time during a hard acceleration event, according to embodiments shown and described herein.
Figure 10F:
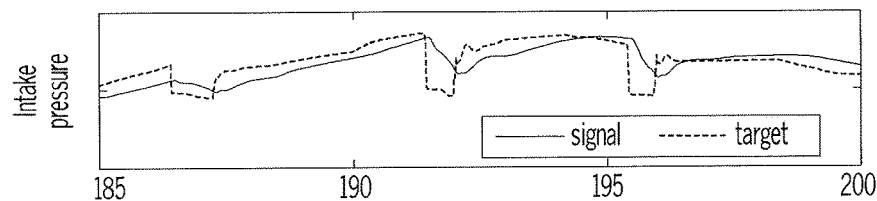
FIG. 10F depicts a chart of intake manifold pressure as a function of time during a hard acceleration event, according to embodiments shown and described herein.
Figure 10G:
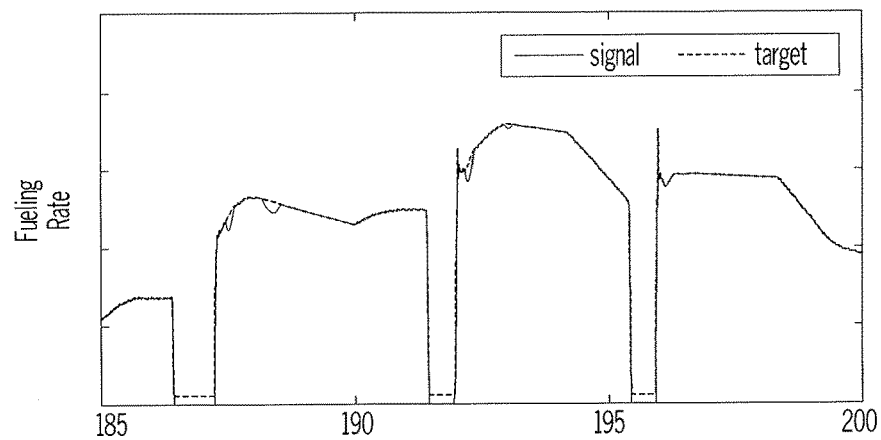
FIG. 10G depicts a chart of fueling rate as a function of time during a hard acceleration event, according to one or more embodiments shown and described herein.
Figure 10H:
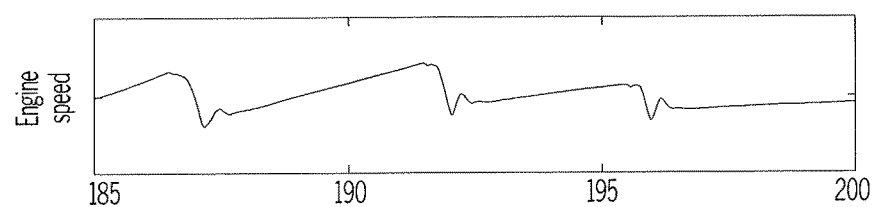
FIG. 10H depicts a chart of engine speed as a function of time during a hard acceleration event, according to embodiments shown and described herein.
Figure 10I:
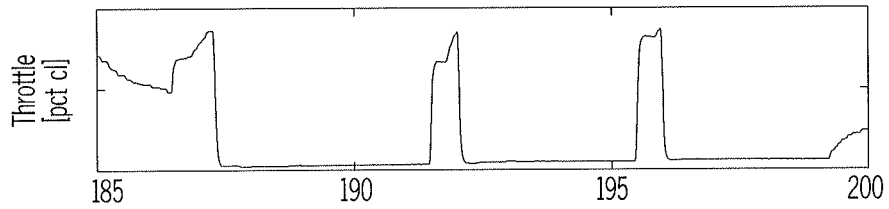
FIG. 10I depicts a chart of throttle (percent closed) as a function of time during a hard acceleration event, according to embodiments shown and described herein.
Figure 10J:
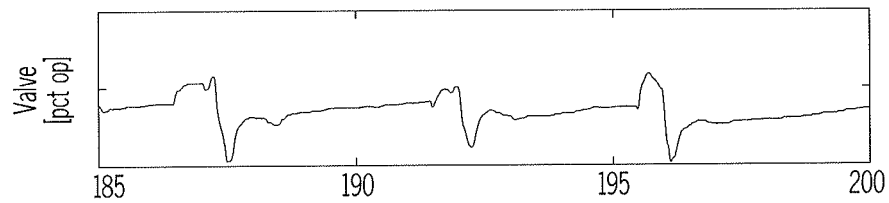
FIG. 10J depicts a chart of EGR valve (percent open) as a function of time during a hard acceleration event, according to embodiments shown and described herein.
Figure 10K:
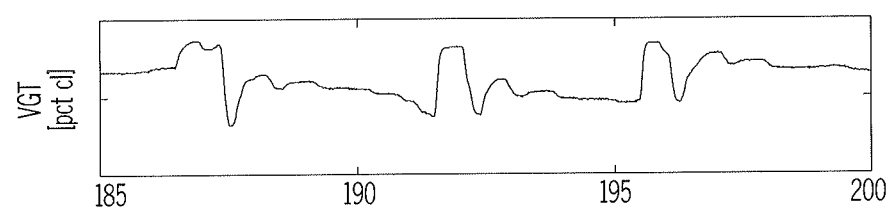
FIG. 10K depicts a chart of VGT (percent closed) as a function of time during a hard acceleration event, according to embodiments shown and described herein.
Figure 10L:
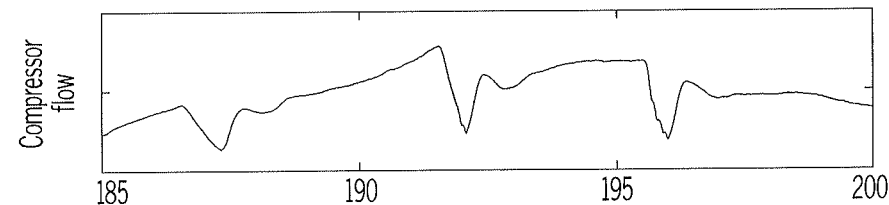
FIG. 10L depicts a chart of compressor flow as a function of time during a hard acceleration event, according to embodiments shown and described herein.
Figure 10M:
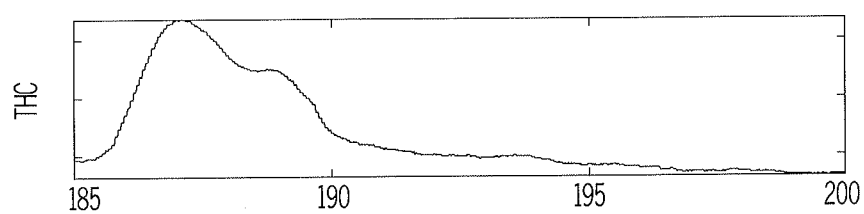
FIG. 10M depicts a chart of total hydrocarbon concentration (THC) as a function of time during a hard acceleration event, according to embodiments shown and described herein.
Figure 11A:
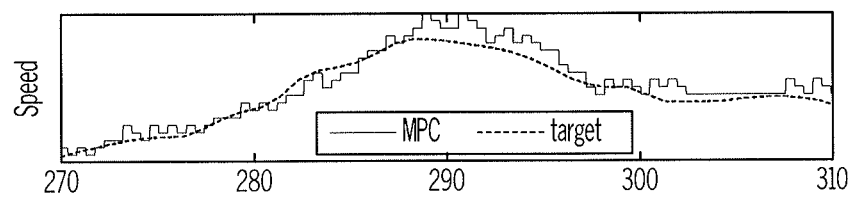
FIG. 11A depicts a chart of vehicle speed as a function of time, according to embodiments shown and described herein.
Figure 11B:
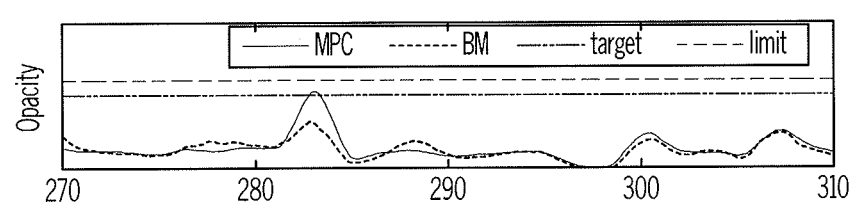
FIG. 11B depicts a chart of smoke opacity as a function of time, according to embodiments shown and described herein.
Figure 11C:
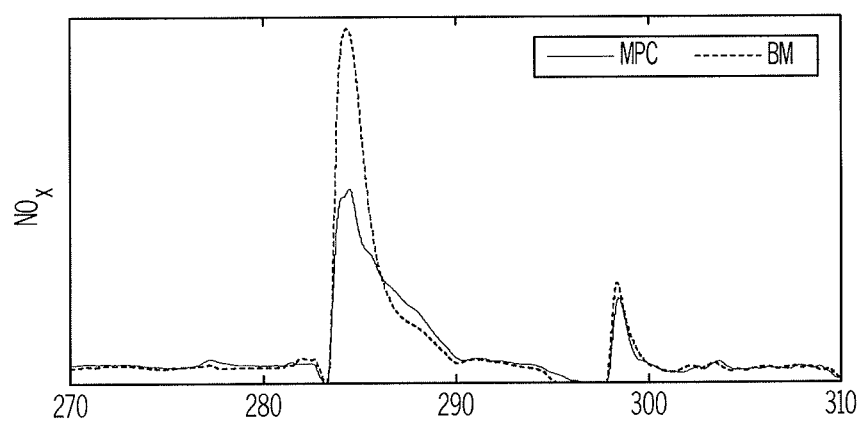
FIG. 11C depicts a chart of $NO_x$ as a function of time, according to embodiments shown and described herein.
Figure 11D:
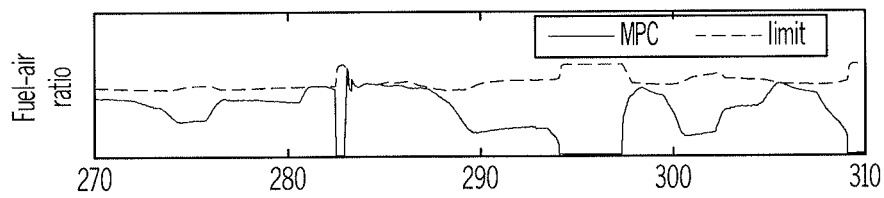
FIG. 11D depicts a chart of fuel-air ratio as a function of time, according to embodiments shown and described herein.
Figure 11E:
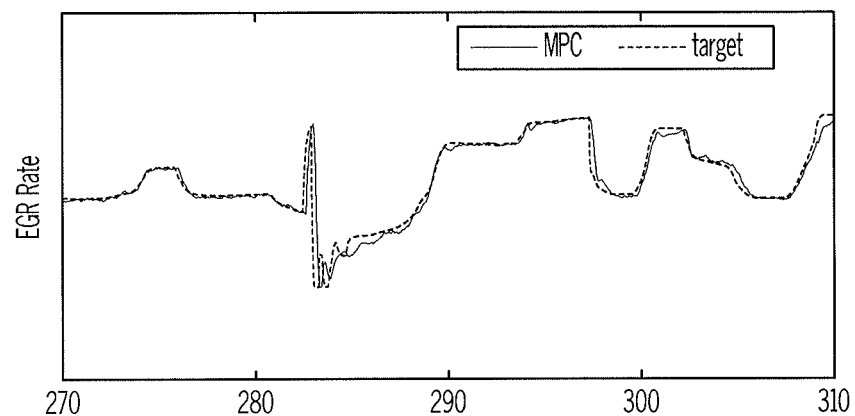
FIG. 11E depicts a chart of EGR rate as a function of time, according to embodiments shown and described herein.
Figure 11F:
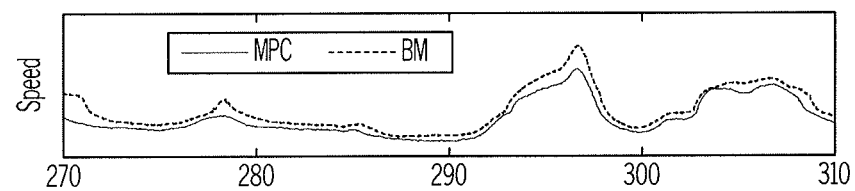
FIG. 11F depicts a chart of total hydrocarbon concentration (THC) as a function of time, according to embodiments shown and described herein.
Figure 11G:
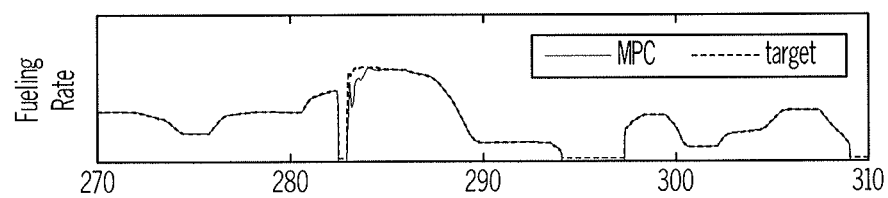
FIG. 11G depicts a chart of fueling rate as a function of time, according to one or more embodiments shown and described herein.
Figure 11H:
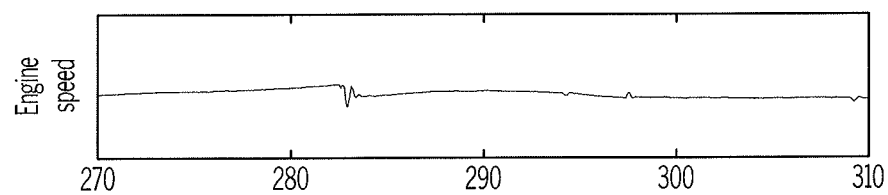
FIG. 11H depicts a chart of engine speed as a function of time, according to embodiments shown and described herein.
Figure 11I:
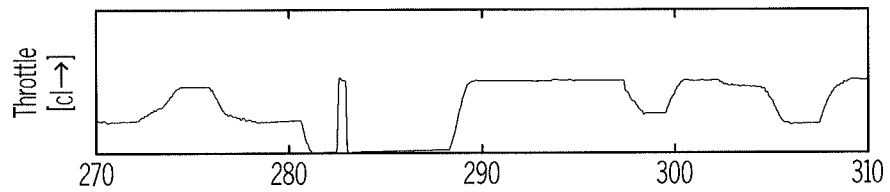
FIG. 11I depicts a chart of throttle (percent closed) as a function of time, according to embodiments shown and described herein.
Figure 11J:
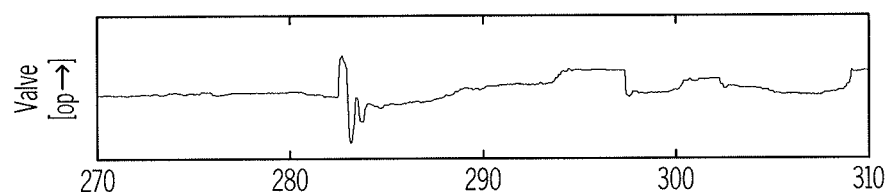
FIG. 11J depicts a chart of EGR valve (percent open) as a function of time, according to embodiments shown and described herein.
Figure 11K:
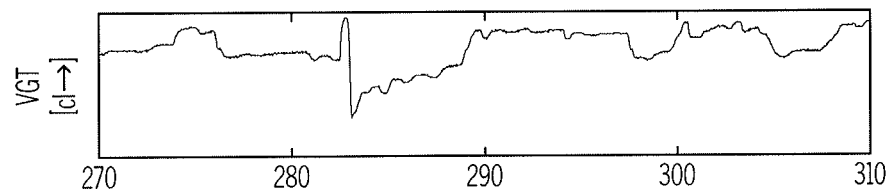
FIG. 11K depicts a chart of VGT (percent closed) as a function of time, according to embodiments shown and described herein.
Figure 11L:
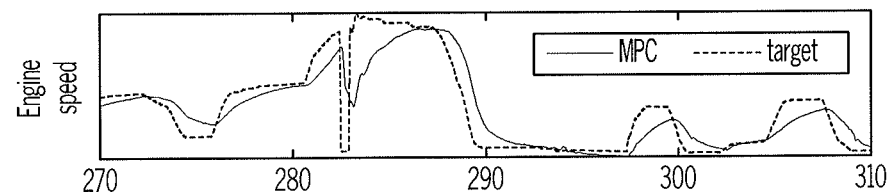
FIG. 11L depicts a chart of intake manifold pressure as a function of time, according to embodiments shown and described herein.

Referring to FIGS. 8A-11L, several charts are depicted with results for various parameters of the engine airpath. Each chart is presented with respect to time in seconds. Referring to FIGS. 8A-8C, the results of a diesel airpath controller in closed loop with an engine during a high load portion of the Worldwide Harmonized Light Vehicles Test Cycle (WLTC). The generation of smoke is well controlled with only a few spikes, which come close to the visible range. Referring to FIGS. 9A-9M, the results of a diesel airpath controller in closed loop with an engine during a high-speed portion of the WLTC. It may be observed between 165 and 170 seconds that the supervisory controller, as described herein, predicts a fuel-air ratio constraint violation, and, in response, lowers the EGR rate target and limits the fuel to enforce the constraint. As a result, the exhaust opacity remains below a visible limit.

Referring to FIGS. 10A-10M, the response of the diesel engine airpath controller during an acceleration event is depicted. As the speed of the vehicle increases, three gearshifts occur. Each gearshift includes a tip in (fuel step up). In response to each tip in, the supervisory controller predicts a fuel-air ratio constraint violation and reduces the EGR rat target, in order to empty the intake manifold of burnt gas, and limits the fuel to enforce the constraint and prevent visible smoke. The target then returns to the nominal EGR rate as quickly as possible to reduce $NO_x$. Due to integration of MIMO feedforward and feedback, the inner-loop nonlinear controller is able to use the VGT and EGR valve to track the EGR rate target very accurately. This fast EGR rate tracking ensures that the fuel-air ratio constraint satisfaction is accomplished primarily with valve and VGT actuation, rather than with fuel limiting, which enhances drivability.

Referring to FIGS. 11A-11M, an input-output benchmark comparison between the diesel engine airpath controller and a benchmark is depicted. The diesel engine airpath controller reduces transient $NO_x$ by shrinking the spikes that occur after gearshifts. This is possible because (i) the supervisory controller brings the EGR rate target back to its nominal quickly after a tip in by accurately calculating the fuel-air ratio response using its prediction model and (ii) because the nonlinear controller is able to track very fast EGR rate transients by exploiting both the VGT and EGR valve.

It should now be understood that the supervisory controller and the nonlinear controller operate in a cascade architecture where the supervisory controller predicts a constraint violation based on at least a fuel rate target and provides the nonlinear controller with adjusted targets in response to predicting a constraint violation. The nonlinear controller, using engine models, may determine actuator commands to transmit to the engine for operating the engine with reduced or no constraint violations.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for controlling an engine airpath comprising:
   receiving, at a supervisory controller, an engine speed corresponding to a present engine speed, a fuel target corresponding to a request for torque from a driver, and one or more state estimates generated by an estimator;
   predicting over a prediction horizon, with the supervisory controller, a constraint violation in response to the engine speed, the fuel target, and the one or more state estimates using a prediction model;
   adjusting an EGR rate target to a modified value, with the supervisory controller, when the constraint violation is predicted;
   maintaining the EGR rate target at a nominal value when the constraint violation is not predicted;
   receiving, at a nonlinear predictive controller, the EGR rate target;
   generating, with the nonlinear predictive controller, one or more actuator commands based on the EGR rate target, wherein the one or more actuator commands control one or more of an EGR throttle, an EGR valve, and a VGT such that an EGR rate of the engine airpath tracks the EGR rate target; and
   transmitting the one or more actuator commands to an engine of the engine airpath.

2. The method of claim 1, further comprising determining, with the estimator, the one or more state estimates based on, an intake burnt gas fraction, an exhaust burnt gas fraction, and one or more signals from one or more sensors, wherein the one or more sensors generate the one or more signals indicative of at least one of: a compressor inlet mass air flow, an intake manifold pressure, and an exhaust manifold pressure.

3. The method of claim 1, further comprising generating a fuel command, with the supervisory controller, when the constraint violation is predicted, wherein the fuel command corresponds to an amount of fuel to provide to the engine coupled to the engine airpath.

4. The method of claim 1, wherein the predicted constraint violation is a fuel-air ratio constraint violation and the step of adjusting the EGR rate target, with the supervisory controller, reduces the EGR rate target such that a fuel-air ratio constraint is enforced.

5. The method of claim 4, further comprising returning the EGR rate target to the nominal value after adjusting the EGR rate target to the modified value based on the predicted fuel-air ratio constraint violation.

6. The method of claim 1, wherein the one or more state estimates comprises at least one of the following:
   an exhaust manifold pressure signal indicative of a pressure within an exhaust manifold of the engine airpath,
   an intake manifold pressure signal indicative of a pressure within an intake manifold of the engine airpath,
   a compressor inlet mass air flow signal indicative of air flow within a compressor of the engine airpath,
   an intake burnt gas fraction signal indicative of a fraction of burnt gas within the intake manifold of the engine airpath, and
   an exhaust burnt gas fraction signal indicative of a fraction of burnt gas within the exhaust manifold of the engine airpath.

7. The method of claim 1, further comprising solving an optimal control problem with the supervisory controller to determine the EGR rate target.

8. A system for controlling an engine airpath comprising:
   a processor communicatively coupled to a non-transitory computer-readable medium, wherein the non-transitory computer-readable medium stores instructions that, when executed by the processor, cause the processor to:
   receive an engine speed corresponding to a present engine speed, a fuel target corresponding to a request for torque from a driver and one or more state estimates generated by an estimator;
   predict over a prediction horizon a constraint violation in response to the engine speed, the fuel target, and the one or more state estimates using a prediction model;
   adjust an EGR rate target to a modified value when the constraint violation is predicted;
   maintain the EGR rate target at a nominal value when the constraint violation is not predicted;
   generate one or more actuator commands based on the EGR rate target, wherein the one or more actuator commands control one or more of an EGR throttle, an EGR valve, and a VGT such that an EGR rate of the engine airpath tracks the EGR rate target; and
   transmit the one or more actuator commands to a valve of an engine.

9. The system of claim 8, further comprising a diesel engine having one or more sensors configured to generate one or more signals indicative of at least one of: a compressor inlet mass air flow, an intake manifold pressure, and an exhaust manifold pressure, the one or more sensors communicatively coupled to the processor, wherein the instructions stored on the non-transitory computer-readable medium, when executed by the processor, further cause the processor to:

determine the one or more state estimates based on, an intake burnt gas fraction, an exhaust burnt gas fraction, and the one or more signals from the one or more sensors.

10. The system of claim 8, wherein the instructions stored on the non-transitory computer-readable medium, when executed by the processor, further cause the processor to:
generate a fuel command when the constraint violation is predicted, wherein the fuel command corresponds to an amount of fuel to provide to the engine coupled to the engine airpath.

11. The system of claim 8, wherein the predicted constraint violation is a fuel-air ratio constraint violation and the instructions stored on the non-transitory computer-readable medium, when executed by the processor, further cause the processor to reduce the EGR rate target such that a fuel-air ratio constraint is enforced.

12. The system of claim 11, wherein instructions stored on the non-transitory computer-readable medium, when executed by the processor, further cause the processor to:
return the EGR rate target to the nominal value after adjusting the EGR rate target to the modified value based on the predicted fuel-air ratio constraint violation.

13. The system of claim 8, wherein the one or more state estimates comprises at least one of the following:
an exhaust manifold pressure signal indicative of a pressure within an exhaust manifold of the engine airpath,
an intake manifold pressure signal indicative of a pressure within an intake manifold of the engine airpath,
a compressor inlet mass air flow signal indicative of air flow within a compressor of the engine airpath,
an intake burnt gas fraction signal indicative of a fraction of burnt gas within the intake manifold of the engine airpath, and
an exhaust burnt gas fraction signal indicative of a fraction of burnt gas within the exhaust manifold of the engine airpath.

14. The system of claim 8, wherein the instructions stored on the non-transitory computer-readable medium, when executed by the processor, further cause the processor to:
solve an optimal control problem thereby computing the EGR rate target.

15. A vehicle comprising:
a diesel engine comprising a diesel engine airpath;
a sensor coupled to the diesel engine airpath;
an actuator coupled to the diesel engine airpath;
an electronic control unit comprising a processor and a non-transitory computer-readable medium, the electronic control unit communicatively coupled to the sensor and the actuator, and the non-transitory computer-readable medium stores instructions that, when executed by the processor, cause the processor to:
receive an engine speed corresponding to a present engine speed, a fuel target corresponding to a request for torque from a driver and one or more state estimates generated by an estimator;
predict, over a prediction horizon, a constraint violation in response to the engine speed, the fuel target, and the one or more state estimates;
adjust an EGR rate target to a modified value when the constraint violation is predicted;
maintain the EGR rate target at a nominal value when the constraint violation is not predicted;
generate one or more actuator commands based on the EGR rate target, wherein the one or more actuator commands control the actuator such that an EGR rate of the diesel engine airpath tracks the EGR rate target; and
transmit the one or more actuator commands to the actuator of the diesel engine.

16. The vehicle of claim 15, wherein the diesel engine airpath further comprises an EGR throttle, an EGR valve, and a VGT, and the one or more actuator commands cause at least one of the EGR throttle, the EGR valve, and the VGT to be adjusted.

17. The vehicle of claim 15, wherein the instructions stored on the non-transitory computer-readable medium, when executed by the processor, further cause the processor to:
generate a fuel command when the constraint violation is predicted, wherein the fuel command corresponds to an amount of fuel to provide to an engine coupled to the diesel engine airpath.

18. The vehicle of claim 15, wherein the predicted constraint violation is a fuel-air ratio constraint violation and the instructions stored on the non-transitory computer-readable medium, when executed by the processor, further cause the processor to reduce the EGR rate target such that a fuel-air ratio constraint is enforced.

19. The vehicle of claim 18, wherein the instructions stored on the non-transitory computer-readable medium, when executed by the processor, further cause the processor to:
return the EGR rate target to the nominal value after adjusting the EGR rate target to the modified value based on the predicted fuel-air ratio constraint violation.

20. The vehicle of claim 15, wherein the instructions stored on the non-transitory computer-readable medium, when executed by the processor, further cause the processor to:
solve an optimal control problem thereby computing the EGR rate target.

* * * * *

UNITED STATES PATENT AND TRADEMARK OFFICE
CERTIFICATE OF CORRECTION

PATENT NO. : 10,422,290 B1
APPLICATION NO. : 15/952380
DATED : September 24, 2019
INVENTOR(S) : Dominic Liao-McPherson et al.

Page 1 of 1

It is certified that error appears in the above-identified patent and that said Letters Patent is hereby corrected as shown below:

In the Specification

Column 7, Line 39, delete "$\mathbf{w_{vc}}$" and insert -- $w_c$ --, therefor.

Column 10, Line 7, delete "$\mathbf{P^d}$" and insert -- $\mathbb{P}_n^d$ --, therefor.

Column 10, Line 10, delete "$\mathbf{P^2}$" and insert -- $\mathbb{P}_2^2$ --, therefor.

Column 11, Line 35, delete "$\mathbf{q_{trg}}$" and insert -- $q^{trg}$ --, therefor.

Column 14, Line 58, delete "$\chi_{trg}$" and insert -- $\chi^{trg}$ --, therefor.

Column 17, Line 12, delete "$\Delta w_{di},z_{di}$" and insert -- $\Delta w_{di},\bar{z}_{di}$ --, therefor.

Column 17, Line 41, delete "$\bar{p}_{im}(\varphi,$" and insert -- $\bar{p}_{im}(\rho)$, --, therefor.

Signed and Sealed this
Twelfth Day of November, 2019

Andrei Iancu
*Director of the United States Patent and Trademark Office*